US012449958B2

(12) United States Patent
Yang et al.

(10) Patent No.: US 12,449,958 B2
(45) Date of Patent: Oct. 21, 2025

(54) ELECTRONIC DEVICE PROVIDING USER INTERFACE, AND METHOD THEREFOR

(71) Applicant: Samsung Electronics Co., Ltd., Suwon-si (KR)

(72) Inventors: Changmo Yang, Suwon-si (KR); Heeyul Kim, Suwon-si (KR); Younghak Oh, Suwon-si (KR); Won Lee, Suwon-si (KR); Yuni Lee, Suwon-si (KR); Jinkyo Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 18/179,682

(22) Filed: Mar. 7, 2023

(65) Prior Publication Data
US 2023/0221841 A1 Jul. 13, 2023

Related U.S. Application Data

(63) Continuation of application No. PCT/KR2021/012229, filed on Sep. 8, 2021.

(30) Foreign Application Priority Data

Sep. 8, 2020 (KR) .................. 10-2020-0114736

(51) Int. Cl.
*G06F 3/0484* (2022.01)
*G06F 3/0481* (2022.01)
*G06F 3/0488* (2022.01)

(52) U.S. Cl.
CPC .......... *G06F 3/0484* (2013.01); *G06F 3/0481* (2013.01); *G06F 3/0488* (2013.01); *G06F 2203/04803* (2013.01)

(58) Field of Classification Search
CPC ......... G06F 2203/04803; G06F 3/0488; G06F 3/0484; G06F 3/0481; G06F 3/038;
(Continued)

(56) References Cited

U.S. PATENT DOCUMENTS 6,311,076 B1 * 10/2001 Peuhu ................... G06F 1/1652
455/566
7,558,057 B1 * 7/2009 Naksen ................. G06F 1/1652
361/679.56
(Continued)

FOREIGN PATENT DOCUMENTS

EP          2942705 A1 * 11/2015  ............. G06F 3/013
KR    10-2010-0009008 A     1/2010
(Continued)

OTHER PUBLICATIONS

Sik et al. (Sik), "Electronic apparatus having a combined button and control method thereof", published on Jun. 11, 2018, Document ID: KR-20180062654-A, p. 26. (Year: 2018).*
(Continued)

*Primary Examiner* — Chau T Nguyen
(74) *Attorney, Agent, or Firm* — Jefferson IP Law, LLP

(57) ABSTRACT

An electronic device is provided. The electronic device includes a display configured to display a screen on at least a portion of a display region, a sensor configured to detect an expansion or reduction of the display region, and a processor operatively connected to the display. The processor is configured to receive user input related to the screen displayed on the at least the portion of the display region, identify an expansion of the display region through the sensor, and display an input user interface (UI), including a UI component determined on the basis of the user input, on at least a portion of the expanded display region in response
(Continued)

to the reception of the user input and the identification of the expansion of the display region.

18 Claims, 25 Drawing Sheets

(58) Field of Classification Search
CPC .. G06F 3/04886; G06F 1/1624; G06F 1/1652; G06F 2200/1614; G06F 2203/0381; G06F 2203/04806; G06F 3/017; G06F 3/04883
See application file for complete search history.

(56) References Cited

U.S. PATENT DOCUMENTS

| | | | |
|---|---|---|---|
| 8,760,418 B2* | 6/2014 | Miyazawa | G06F 3/0488 |
| | | | 345/173 |
| 9,471,145 B2* | 10/2016 | Langlois | G06F 3/04886 |
| 10,509,560 B2 | 12/2019 | Kim et al. | |
| 10,691,172 B2* | 6/2020 | Jovanovic | G06F 1/1656 |
| 2013/0203469 A1 | 8/2013 | Cho et al. | |
| 2016/0062648 A1* | 3/2016 | Jeong | G06F 3/041 |
| | | | 345/173 |
| 2016/0110097 A1 | 4/2016 | Cho | |
| 2016/0349971 A1 | 12/2016 | Chi et al. | |
| 2016/0373654 A1 | 12/2016 | Kwon et al. | |
| 2016/0378270 A1 | 12/2016 | Lee et al. | |
| 2017/0147189 A1 | 5/2017 | Ryu et al. | |
| 2018/0074636 A1* | 3/2018 | Lee | H04M 1/724 |
| 2018/0084099 A1 | 3/2018 | Cho et al. | |
| 2018/0103550 A1* | 4/2018 | Seo | G06F 1/1624 |
| 2018/0107303 A1 | 4/2018 | Park et al. | |
| 2018/0275770 A1 | 9/2018 | Kang et al. | |
| 2019/0261519 A1 | 8/2019 | Park et al. | |
| 2021/0035494 A1* | 2/2021 | Yildiz | G06F 3/0412 |
| 2023/0017380 A1* | 1/2023 | Kim | G06F 1/1624 |
| 2023/0038834 A1* | 2/2023 | Kang | G06F 3/04886 |

FOREIGN PATENT DOCUMENTS

| | | |
|---|---|---|
| KR | 10-2015-0094492 A | 8/2015 |
| KR | 10-2016-0036387 A | 4/2016 |
| KR | 10-1649656 B1 | 8/2016 |
| KR | 10-2016-0139320 A | 12/2016 |
| KR | 10-2016-0139643 A | 12/2016 |
| KR | 10-2016-0150539 A | 12/2016 |
| KR | 10-2017-0048007 A | 5/2017 |
| KR | 10-2017-0077434 A | 7/2017 |

OTHER PUBLICATIONS

International Search Report with Written Opinion and English translated dated Dec. 23, 2021; International Application No. PCT/KR2021/012229.
Extended European Search Report dated Jan. 5, 2024; European Appln. No. 21867120.4-1224 / 4198700 PCT/KR2021012229.
Korean Notice of Preliminary Rejection dated Mar. 17, 2025, issued in Korean Application No. 10-2020-0114736.
Korean Notice of Patent Grant dated Jul. 25, 2025, issued in Korean Application No. 10-2020-0114736.

* cited by examiner

ELECTRONIC DEVICE PROVIDING USER INTERFACE, AND METHOD THEREFOR

CROSS-REFERENCE TO RELATED APPLICATION(S)

This application is a continuation application, claiming priority under § 365(c), of an International application No. PCT/KR2021/012229, filed on Sep. 8, 2021, which is based on and claims the benefit of a Korean patent application number 10-2020-0114736, filed on Sep. 8, 2020, in the Korean Intellectual Property Office, the disclosure of which is incorporated by reference herein in its entirety.

BACKGROUND

1. Field

The disclosure relates to an electronic device and a method of controlling the electronic device.

2. Description of Related Art

Portable electronic devices are evolving into various forms to secure an extended display region without interfering with portability. For example, the electronic device may be configured as a slide type electronic device in which a first structure and a second structure are deployed in a sliding manner relative to each other when used at a position where they overlap each other, or a foldable type electronic device in which the first structure and the second structure match each other to overlap or be unfolded. Alternatively, the electronic device may be configured in various forms (e.g., a rollable display) capable of expanding the display region by using a flexible display.

The above information is presented as background information only to assist with an understanding of the disclosure. No determination has been made, and no assertion is made, as to whether any of the above might be applicable as prior art with regard to the disclosure.

SUMMARY

Since the expansion of the display region of an electronic device may change the usability of the electronic device, the electronic device is required to provide a user interface suitable for the changed usability.

Aspects of the disclosure are to address at least the above-mentioned problems and/or disadvantages and to provide at least the advantages described below. Accordingly, an aspect of the disclosure is to provide a user interface for easily manipulating an electronic device having an expanded display region.

Additional aspects will be set forth in part in the description which follows and, in part, will be apparent from the description, or may be learned by practice of the presented embodiments.

In accordance with an aspect of the disclosure, an electronic device is provided. The electronic device includes a display configured to display a screen on at least a portion of a display region, a sensor configured to detect an expansion and reduction of the display region, and a processor configured to be operatively connected to the display. The processor may be configured to receive a user input related to the screen displayed on the at least the portion of the display region, identify the expansion of the display region through the sensor, and display an input user interface (UI) including a UI component determined based on the user input, on at least a portion of the expanded display region in response to the reception of the user input and the identification of the expansion of the display region.

In accordance with another aspect of the disclosure, a method of performed by an electronic device including a display is provided. The method includes displaying a screen on at least a portion of a display region of the display, receiving a user input related to a screen displayed on the at least the portion of the display region, identifying an expansion of the display region through a sensor of the electronic device, and displaying an input UI including a UI component determined based on the user input, on at least a portion of the expanded display region in response to the receiving of the user input and the identifying of the expansion of the display region.

An electronic device and an operating method thereof according to various embodiments may provide a user interface for easily manipulating an electronic device having an expanded display region.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
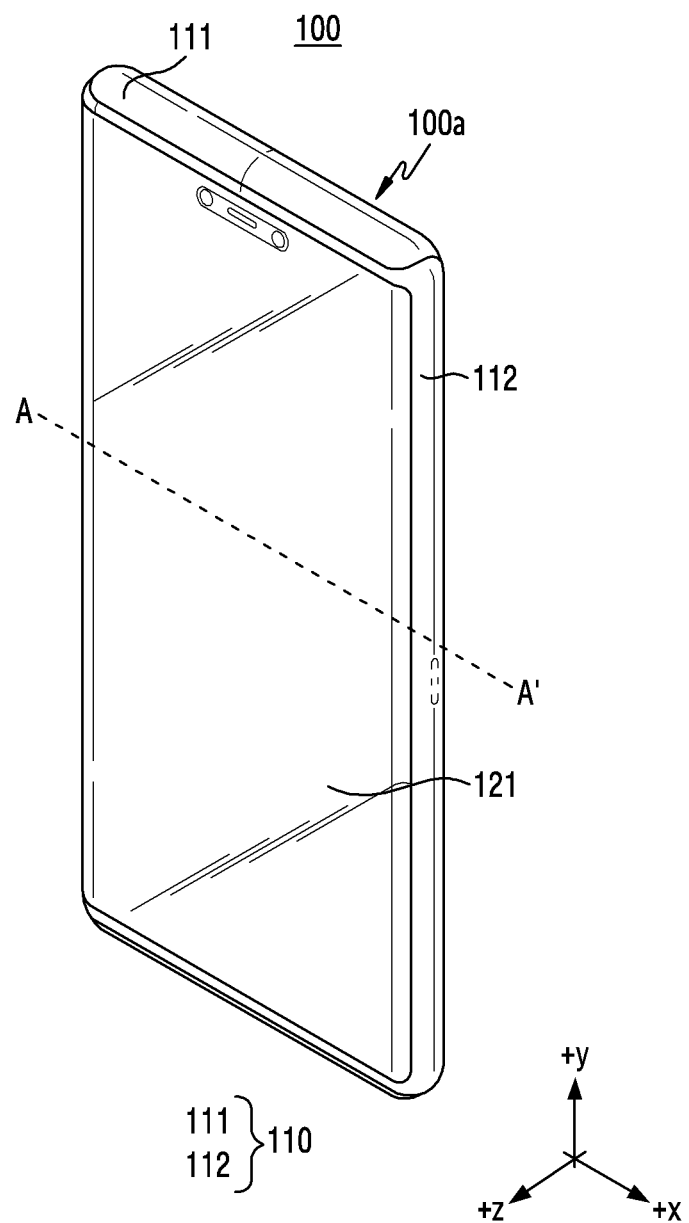
FIG. 1 is a front perspective view illustrating an electronic device in a first state according to an embodiment of the disclosure.
Figure 2:
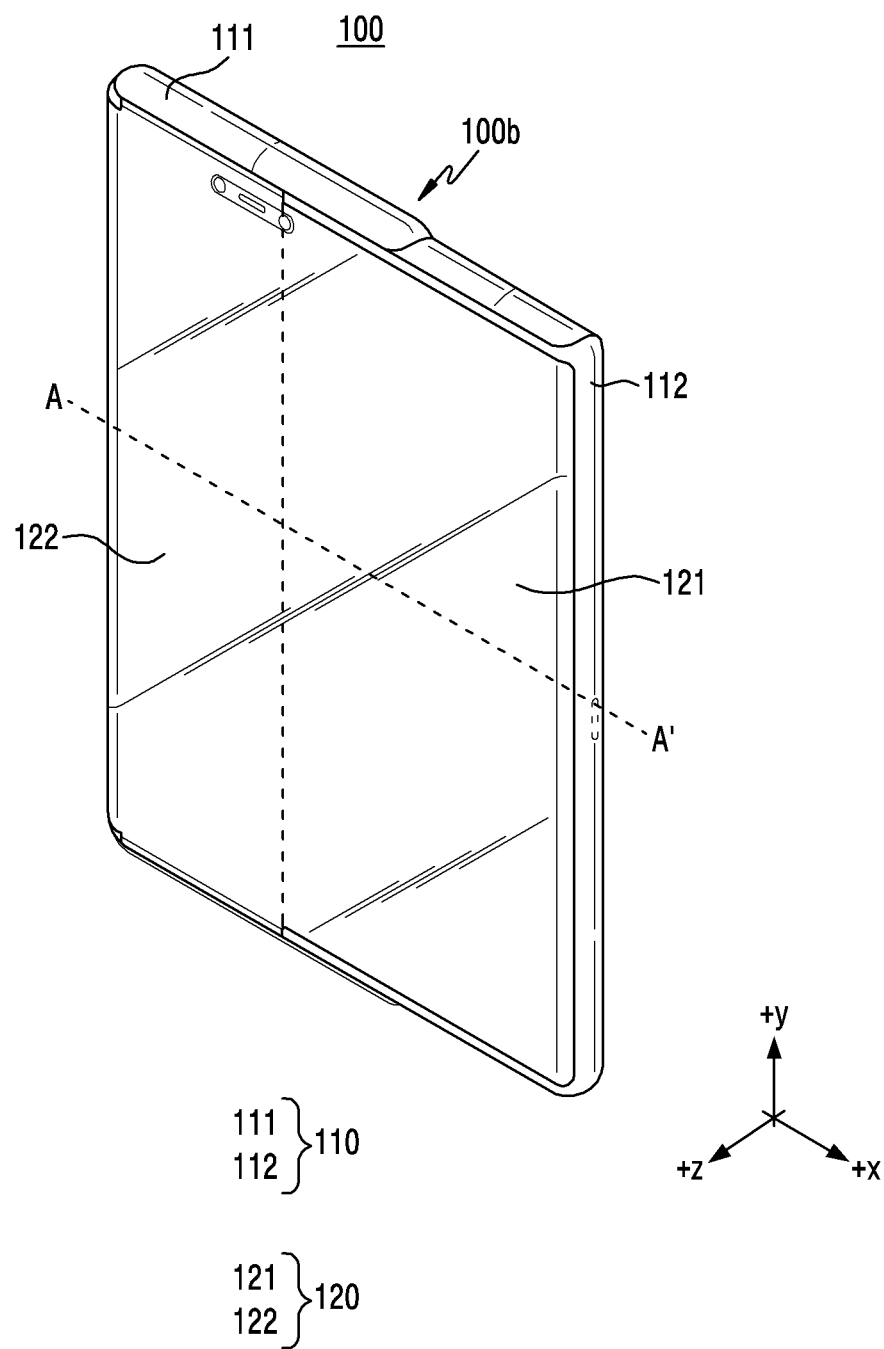
FIG. 2 is a front perspective view illustrating an electronic device in a second state according to an embodiment of the disclosure.

FIG. 1 is a front perspective view illustrating an electronic device 100 in a first state according to an embodiment of the disclosure. FIG. 2 is a front perspective view illustrating the electronic device 100 in a second state according to an embodiment of the disclosure.

According to various embodiments disclosed in this document, a surface facing substantially the same direction as a direction in which at least a portion (e.g., a first portion 121) of a flexible display 120 located outside the electronic device 100 faces may be defined as a front surface of the electronic device 100, and a surface facing the front surface may be defined as a rear surface of the electronic device 100. A surface surrounding a space between the front surface and the rear surface may be defined as a side surface of the electronic device 100.

The flexible display 120 may be disposed on at least a portion of the electronic device 100 according to an embodiment. In an embodiment, the flexible display 120 may be disposed to include at least partial flat shape and at least partial curved shape. In an embodiment, the flexible display 120 and a slidable housing 110 surrounding at least a part of a periphery of the flexible display 120 may be disposed on the front surface of the electronic device 100.

In an embodiment, the slidable housing 110 may form a partial region of the front surface (e.g., a surface of the electronic device 100 facing a +z direction in FIGS. 1 and 2), the rear surface (e.g., a surface of the electronic device 100 facing a −z direction in FIGS. 1 and 2), and the side surface (e.g., a surface connecting the front surface and the rear surface of the electronic device 100) of the electronic device 100. In another embodiment, the slidable housing 110 may form a partial region of the side surface and the rear surface of the electronic device 100.

In an embodiment, the slidable housing 110 may include a first housing 111 and a second housing 112 movably coupled to the first housing 111 within a predetermined range.

In an embodiment, the flexible display 120 may include a first portion 121 that can be coupled to the second housing 112, and a second portion 122 that extends from the first portion 121 and is inserted into the electronic device 100.

In an embodiment, the electronic device 100 may include a first state 100*a* and a second state 100*b*. For example, the first state 100*a* and the second state 100*b* of the electronic device 100 may be determined according to the relative position of the second housing 112 with respect to the slidable housing 110, and the electronic device 100 may be configured to be changeable between the first state and the second state by a user's manipulation or mechanical operation.

In various embodiments, the first state 100a of the electronic device 100 may refer to a state before the slidable housing 110 is expanded. The second state 100b of the electronic device 100 may refer to a state in which the slidable housing 110 is expanded.

In an embodiment, when the electronic device 100 is switched from the first state 100a to the second state 100b according to the movement of the second housing 112, the second portion 122 of the flexible display 120 may be retreated (or exposed) from the inside of the electronic device 100 to the outside. In various embodiments, the fact that the flexible display 120 is retreated (or exposed) may mean that the flexible display 120 is viewable from the outside of the electronic device 100. In another embodiment, when the electronic device 100 is switched from the second state 100b to the first state 100a according to the movement of the second housing 112, the second portion 122 of the flexible display 120 may be inserted into the electronic device 100. In various embodiments, the fact that the flexible display 120 is inserted in may mean that the flexible display 120 is not visible from the outside of the electronic device.

Figure 3:
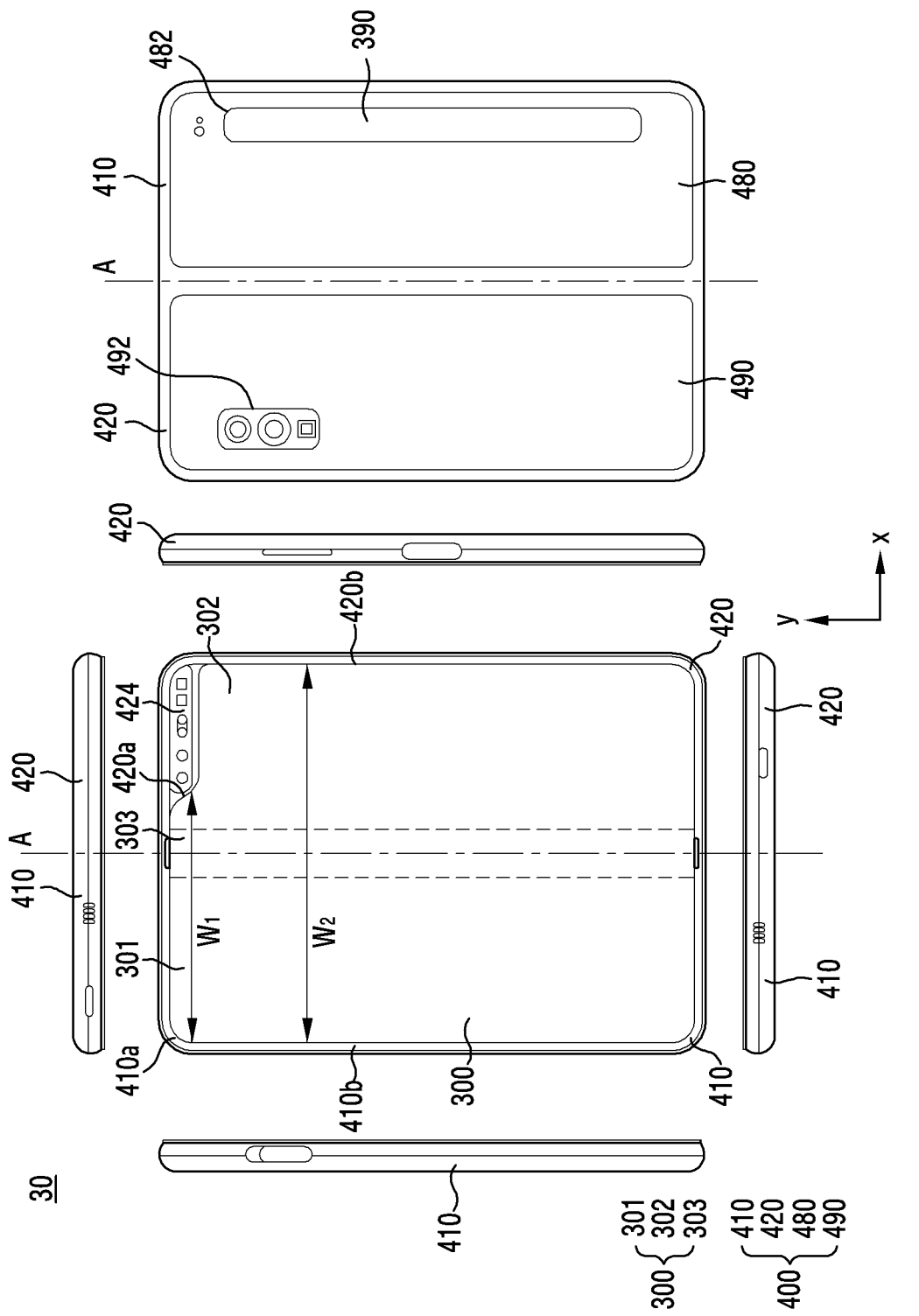
FIG. 3 is a diagram illustrating a flat state of an electronic device according to an embodiment of the disclosure.

FIG. 3 is a diagram illustrating a flat state of an electronic device according to an embodiment of the disclosure.

Figure 4:
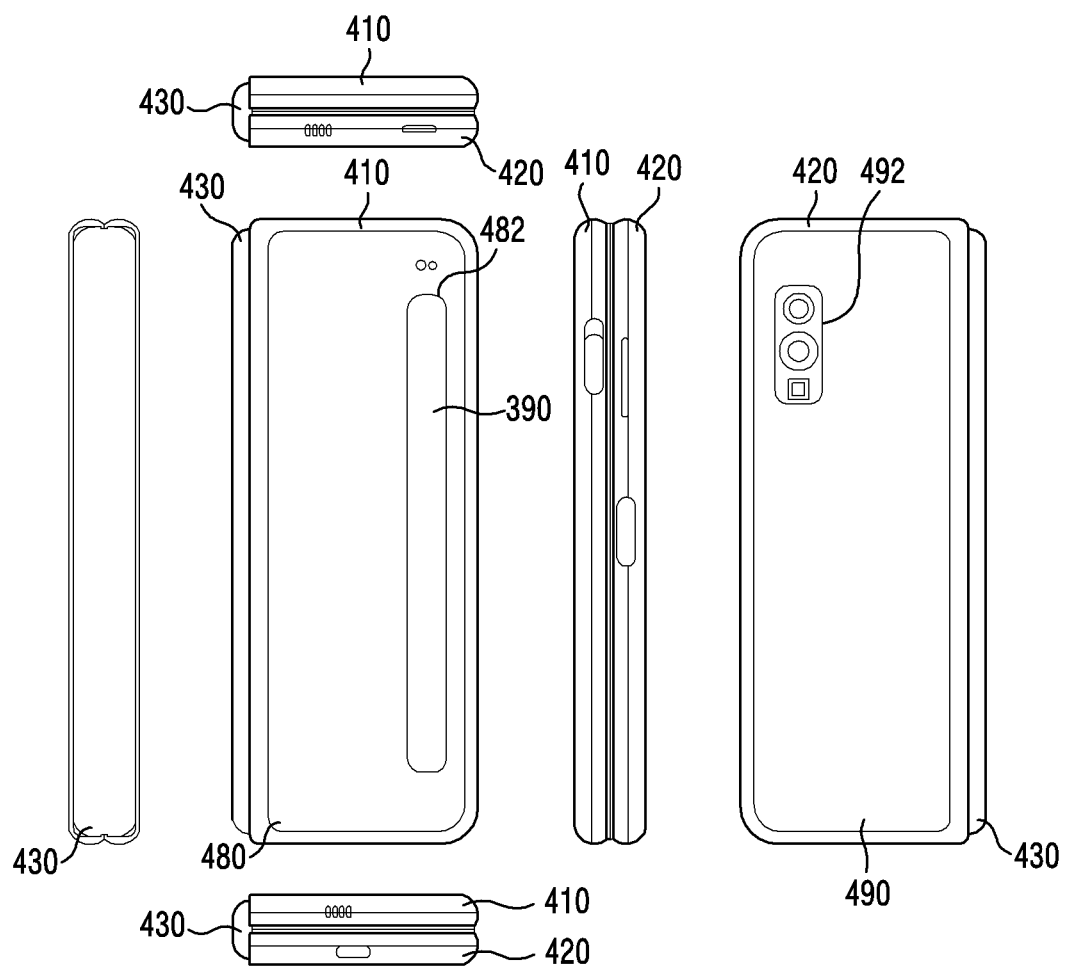
FIG. 4 is a diagram illustrating a folded state of an electronic device according to an embodiment of the disclosure.

FIG. 4 is a diagram illustrating a folded state of an electronic device according to an embodiment of the disclosure.

Referring to FIGS. 3 and 4, in an embodiment, an electronic device 30 may include a foldable housing 400, a hinge cover 430 that covers a foldable portion of the foldable housing, and a flexible or foldable display 300 (hereinafter referred to as "display" 300 for short) arranged within a space formed by the foldable housing 400. In this document, a surface on which the display 300 is disposed is defined as a first surface or a front surface of the electronic device 30. A surface opposite the front surface is defined as a second surface or a rear surface of the electronic device 30. In addition, a surface surrounding a space between the front and rear surfaces is defined as a third surface or a side surface of the electronic device 30.

In an embodiment, the foldable housing 400 may include a first housing structure 410, a second housing structure 420 including a sensor area 424, a first rear cover 480, and a second rear cover 490. The foldable housing 400 of the electronic device 30 is not limited to the shapes and combinations shown in FIGS. 3 and 4, and may be implemented by other shapes or combinations and/or coupling of components. For example, in another embodiment, the first housing structure 410 and the first rear cover 480 may be integrally formed, and the second housing structure 420 and the second rear cover 490 may be integrally formed.

In the illustrated embodiment, the first housing structure 410 and the second housing structure 420 may be arranged on both sides of a folding axis (axis A) and may have shapes generally symmetrical with each other with respect to the folding axis A. As will be described later, depending on whether the electronic device is in an expanded state, a folded state, or an intermediate state, the angle or distance between the first housing structure 410 and the second housing structure 420 may vary. In the illustrated embodiment, the second housing structure 420, unlike the first housing structure 410, may additionally include the sensor area 424 where various sensors are arranged, but the second housing structure 420 and the first housing structure 410 may have mutually symmetrical shapes in other areas.

In an embodiment, as shown in FIG. 3, the first housing structure 410 and the second housing structure 420 may together form a recess accommodating a display 300. In the illustrated embodiment, due to the sensor area 424, the recess may have two or more different widths in a direction perpendicular to the folding axis A.

For example, the recess may have (1) a first width w1 between a first portion 410a of the first housing structure 410 that is parallel to the folding axis A and the first portion 420a formed at the periphery of the sensor area 424 of the second housing structure 420, and (2) a second width w2 formed by a second portion 410b of the first housing structure 410 and the second portion 420b of the second housing structure 420 that does not correspond to the sensor area 424 and is parallel to the folding axis A. In this case, the second width w2 may be formed longer than the first width w1. In other words, the first portion 410a of the first housing structure 410 and the first portion 420a of the second housing structure 420 having mutually asymmetrical shapes may form the first width w1 of the recess, and the second portion 410b of the first housing structure 410 and the second portion 420b of the second housing structure having mutually symmetrical shapes may form the second width w2 of the recess. In an embodiment, the first portion 420a and the second portion 420b of the second housing structure 420 may have different distances from the folding axis A. The width of the recess is not limited to the illustrated example. In various embodiments, the recess may have a plurality of widths due to the shape of the sensor area 424 or the asymmetrical shape of the first housing structure 410 and the second housing structure 420.

In an embodiment, at least a portion of the first housing structure 410 and the second housing structure 420 may be made of a metal material or a non-metal material having rigidity of a size selected to support the display 300.

In an embodiment, the sensor area 424 may be formed to have a predetermined area adjacent to one corner of the second housing structure 420. However, the arrangement, shape, and size of the sensor area 424 are not limited to the illustrated example. For example, in another embodiment, the sensor area 424 may be provided in another corner of the second housing structure 420 or an arbitrary area between the top corner and the bottom corner of the second housing structure 420. In an embodiment, components for performing various functions built into the electronic device 30 may be exposed on the front surface or rear surface of the electronic device 30 through the sensor area 424 or one or more openings provided in the sensor area 424. In various embodiments, the components may include various types of sensors. The sensor may include, for example, at least one of a front camera, a receiver, and a proximity sensor.

The first rear cover 480 may be disposed on one side of the folding axis on the rear surface of the electronic device 30 and may have, for example, a substantially rectangular periphery, and the periphery may be wrapped by the first housing structure 410. Similarly, the second rear cover 490 may be disposed on the other side of the folding axis on the rear surface of the electronic device 30, and the periphery of the second rear cover 490 may be wrapped by the second housing structure 420.

In the illustrated embodiment, the first rear cover 480 and the second rear cover 490 may have substantially symmetrical shapes with respect to the folding axis (A-axis). However, the first rear cover 480 and the second rear cover 490 do not necessarily have symmetrical shapes, and in another embodiment, the electronic device 30 may include a first rear cover 480 and a second rear cover 490 having various shapes. In another embodiment, the first rear cover 480 may be integrally formed with the first housing structure 410, and the second rear cover 490 may be integrally formed with the second housing structure 420.

In an embodiment, the first rear cover 480, the second rear cover 490, the first housing structure 410, and the second housing structure 420 may form the space where various components (e.g., a printed circuit board or a battery) of the electronic device 30 are arranged. In an embodiment, one or more components may be arranged or visually exposed on the rear surface of the electronic device 30. For example, at least a portion of a sub display 390 may be visually exposed through a first rear area 482 of the first rear cover 480. In another embodiment, one or more components or sensors may be visually exposed through a second rear area 492 of the second rear cover 490. In various embodiments, the sensor may include a proximity sensor and/or a rear camera.

Referring to FIG. 4, the hinge cover 430 may be disposed between the first housing structure 410 and the second housing structure 420 to cover internal components (e.g., a hinge structure). In an embodiment, the hinge cover 430 may be covered by a portion of the first housing structure 410 and the second housing structure 420 or may be exposed to the outside depending on the state of the electronic device 30 (a flat state or a folded state).

For example, as shown in FIG. 3, when the electronic device 30 is in the flat state, the hinge cover 430 may not be exposed because the hinge cover 430 is covered by the first housing structure 410 and the second housing structure 420. For example, as shown in FIG. 4, when the electronic device 30 is in a folded state (e.g., a fully folded state), the hinge cover 430 may be exposed to the outside between the first housing structure 410 and the second housing structure 420. For example, when the first housing structure 410 and the second housing structure 420 are in an intermediate state in which they are folded with a certain angle, the hinge cover 430 may be partially exposed to the outside between the first housing structure 410 and the second housing structure 420. In this case, the exposed area may be narrower than the area exposed in a completely folded state. In an embodiment, the hinge cover 430 may be formed to include a curved surface.

The display 300 may be disposed on a space formed by the foldable housing 400. For example, the display 300 may be seated in a recess formed by the foldable housing 400 and may constitute most of the front surface of the electronic device 30.

The front surface of the electronic device 30 may include the display 300, a partial area of the first housing structure 410 adjacent to the display 300, and a partial area of the second housing structure 420. The rear surface of the electronic device 30 may include the first rear cover 480, a partial area of the first housing structure 410 adjacent to the first rear cover 480, the second rear cover 490, and a partial area of the second housing structure 420 adjacent to the second rear cover 490.

The display 300 may be configured as a display of which at least partial area can be transformed into a flat or curved surface. In an embodiment, the display 300 may include a folding area 303, a first area 301 disposed on one side (the left side of the folding area 303 of FIG. 3) with respect to the folding area 303, and a second area 302 disposed on the other side (the right side of the folding area 303 of FIG. 3) thereof.

The division of the region of the display 300 shown in FIG. 3 is exemplary, and the display 300 may be divided into a plurality of (e.g., four or more or two) areas according to the structure or functions of the display. For example, in the embodiment shown in FIG. 3, the region of the display 300 may be divided by the folding area 303 extending parallel to a y-axis or the folding axis (A-axis), but in another embodiment, the region of the display 300 may be divided with respect to another folding area (e.g., a folding area parallel to the x-axis) or another folding axis (e.g., a folding axis parallel to the x-axis).

The first area 301 and the second area 302 may have generally symmetrical shapes with respect to the folding area 303. However, unlike the first area 301, the second area 302 may include a notch cut to secure the sensor area 424. The first area 301 and the second area 302 may include a portion having a shape symmetrical to each other and a portion having a shape asymmetrical to each other.

Operations of the first housing structure 410 and the second housing structure 420 according to the state of the electronic device 30 (e.g., a flat state and a folded state) and each area of the display 300 will be described.

In an embodiment, when the electronic device 30 is in the flat state (e.g., FIG. 3), the first housing structure 410 and the second housing structure 420 may be arranged to face the same direction while forming an angle of 180 degrees therebetween. The surface of the first area 301 and the surface of the second area 302 of the display 300 may form an angle of 180 degrees therebetween and may face the same direction (e.g., a direction of the front surface of the electronic device). The folding area 303 may form the same plane as the first area 301 and the second area 302.

In an embodiment, when the electronic device 30 is in the folded state (e.g., FIG. 4), the first housing structure 410 and the second housing structure 420 may face each other. The surface of the first area 301 and the surface of the second area 302 of the display 300 may form a narrow angle (e.g., between 0 degrees and 10 degrees) and may face each other. At least a portion of the folding area 303 may form a curved surface having a predetermined curvature.

In an embodiment, when the electronic device 30 is in an intermediate state (e.g., between the flat state of FIG. 3 and the folded state of FIG. 4), the first housing structure 410 and the second housing structure 420 may be arranged to form a certain angle therebetween. The surface of the first area 301 and the surface of the second area 302 of the display 300 may form an angle greater than that of the folded state and smaller than that of the flat state. At least a portion of the folding area 303 may be formed of a curved surface having a predetermined curvature, and the curvature may be smaller than that in the folded state.

The electronic device 30 may include a sensor for detecting the state (e.g., a folded state, an intermediate state, or a flat state) of the electronic device 30. For example, the electronic device 30 may include a sensor for detecting an angle between the first housing structure 410 and the second housing structure 420 at a hinge portion. For another example, the electronic device 30 may include a sensor for determining whether the electronic device 30 is in the folded state by using a magnetic material disposed on the first housing structure 410 and a Hall sensor disposed on the second housing structure 420.

The electronic device 30 may determine a display region, which is a region where a screen is displayed. According to an embodiment, the electronic device 30 may determine the display region according to the state of the electronic device (e.g., a folded state, an intermediate state, or a flat state). For example, when the electronic device 30 is in the folded state, a region where the sub display 190 can output a screen may be determined as the display region, and when the electronic device 30 is in the flat state, the display region may be expanded so that a region where the display 300 outputs a screen is the display region. For another example, when the electronic device 30 is in the intermediate state, the display region may be determined to have an area determined based on an angle between the first housing structure 410 and the second housing structure 420, and when the electronic device 30 is in the flat state, the display region may be expanded to the entire display 300.

The shape of the electronic device shown in FIGS. 1 to 4 is for explaining an example of an electronic device capable of expanding the display region, and the shape of the electronic device is not limited to those shown in FIGS. 1 to 4. For example, the electronic device may include an electronic device having a rollable display. The electronic device having the rollable display may determine the rest of the display except for the rolled portion thereof as the display region.

Figure 5:
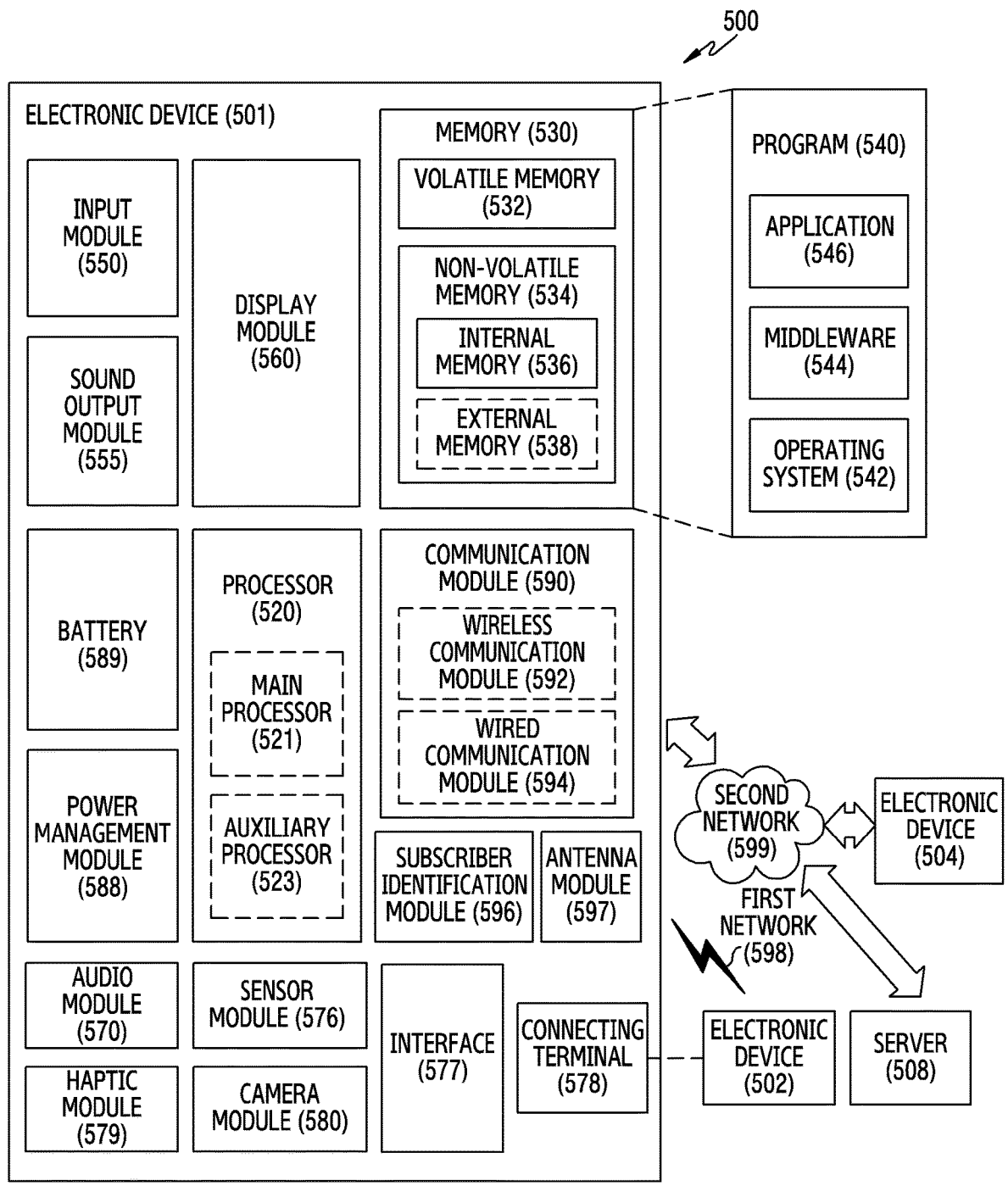
FIG. 5 is a block diagram illustrating an electronic device in a network environment according to an embodiment of the disclosure.

FIG. 5 is a block diagram illustrating an electronic device 501 in a network environment 500 according to an embodiment of the disclosure.

Referring to FIG. 5, the electronic device 501 in the network environment 500 may communicate with an electronic device 502 via a first network 598 (e.g., a short-range wireless communication network), or at least one of an electronic device 504 or a server 508 via a second network 599 (e.g., a long-range wireless communication network). According to an embodiment, the electronic device 501 may communicate with the electronic device 504 via the server 508. According to an embodiment, the electronic device 501 may include a processor 520, memory 530, an input module 550, a sound output module 555, a display module 560, an audio module 570, a sensor module 576, an interface 577, a connecting terminal 578, a haptic module 579, a camera module 580, a power management module 588, a battery 589, a communication module 590, a subscriber identification module (SIM) 596, or an antenna module 597. In some embodiments, at least one of the components (e.g., the connecting terminal 578) may be omitted from the electronic device 501, or one or more other components may be added in the electronic device 501. In some embodiments, some of the components (e.g., the sensor module 576, the camera module 580, or the antenna module 597) may be implemented as a single component (e.g., the display module 560).

The processor 520 may execute, for example, software (e.g., a program 540) to control at least one other component (e.g., a hardware or software component) of the electronic device 501 coupled with the processor 520, and may perform various data processing or computation. According to one embodiment, as at least part of the data processing or computation, the processor 520 may store a command or data received from another component (e.g., the sensor module 576 or the communication module 590) in volatile memory 532, process the command or the data stored in the volatile memory 532, and store resulting data in non-volatile memory 534. According to an embodiment, the processor 520 may include a main processor 521 (e.g., a central processing unit (CPU) or an application processor (AP)), or an auxiliary processor 523 (e.g., a graphics processing unit (GPU), a neural processing unit (NPU), an image signal processor (ISP), a sensor hub processor, or a communication processor (CP)) that is operable independently from, or in conjunction with, the main processor 521. For example, when the electronic device 501 includes the main processor 521 and the auxiliary processor 523, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display module 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera module 580 or the communication module 590) functionally related to the auxiliary processor 523. According to an embodiment, the auxiliary processor 523 (e.g., the neural processing unit) may include a hardware structure specified for artificial intelligence model processing. An artificial intelligence model may be generated by machine learning. Such learning may be performed, e.g., by the electronic device 501 where the artificial intelligence is performed or via a separate server (e.g., the server 508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input module 550 may receive a command or data to be used by another component (e.g., the processor 520) of the electronic device 501, from the outside (e.g., a user) of the electronic device 501. The input module 550 may include, for example, a microphone, a mouse, a keyboard, a key (e.g., a button), or a digital pen (e.g., a stylus pen).

The sound output module 555 may output sound signals to the outside of the electronic device 501. The sound output module 555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 560 may visually provide information to the outside (e.g., a user) of the electronic device 501. The display module 560 may include, for example, a display, a hologram device, or a projector and control circuitry to control a corresponding one of the display, hologram device, and projector. According to an embodiment, the display module 560 may include a touch sensor adapted to detect a touch, or a pressure sensor adapted to measure the intensity of force incurred by the touch.

The audio module 570 may convert a sound into an electrical signal and vice versa. According to an embodiment, the audio module 570 may obtain the sound via the input module 550, or output the sound via the sound output module 555 or a headphone of an external electronic device (e.g., an electronic device 502) directly (e.g., wiredly) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. According to an embodiment, the sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., wiredly) or wirelessly. According to an embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, an SD card connector, or an audio connector (e.g., a headphone connector).

The haptic module 579 may convert an electrical signal into a mechanical stimulus (e.g., a vibration or a movement) or electrical stimulus which may be recognized by a user via his tactile sensation or kinesthetic sensation. According to an embodiment, the haptic module 579 may include, for example, a motor, a piezoelectric element, or an electric stimulator.

The camera module 580 may capture a still image or moving images. According to an embodiment, the camera module 580 may include one or more lenses, image sensors, image signal processors, or flashes.

The power management module 588 may manage power supplied to the electronic device 501. According to one embodiment, the power management module 588 may be implemented as at least part of, for example, a power management integrated circuit (PMIC).

The battery 589 may supply power to at least one component of the electronic device 501. According to an embodiment, the battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the application processor (AP)) and supports a direct (e.g., wired) communication or a wireless communication. According to an embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or infrared data association (IrDA)) or the second network 599 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The wireless communication module 592 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 592 may support a high-frequency band (e.g., the millimeter wave (mmWave) band) to achieve, e.g., a high data transmission rate. The wireless communication module 592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 592 may support various requirements specified in the electronic device 501, an external electronic device (e.g., the electronic device 504), or a network system (e.g., the second network 599). According to an embodiment, the wireless communication module 592 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 597 may transmit or receive a signal or power to or from the outside (e.g., the external electronic device) of the electronic device 501. According to an embodiment, the antenna module 597 may include an antenna including a radiating element composed of a conductive material or a conductive pattern formed in or on a substrate (e.g., a printed circuit board (PCB)). According to an embodiment, the antenna module 597 may include a plurality of antennas (e.g., array antennas). In such a case, at least one antenna appropriate for a communication scheme used in the communication network, such as the first network 598 or the second network 599, may be selected, for example, by the communication module 590 (e.g., the wireless communication module 592) from the plurality of antennas. The signal or the power may then be transmitted or received between the communication module 590 and the external electronic device via the selected at least one antenna. According to an embodiment, another component (e.g., a radio frequency integrated circuit (RFIC)) other than the radiating element may be additionally formed as part of the antenna module 597.

According to various embodiments, the antenna module 597 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 501 and the external electronic device 504 via the server 508 coupled with the second network 599. Each of the electronic devices 502 or 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, mobile edge computing (MEC), or client-server computing technology may be used, for example. The electronic device 501 may provide ultra low-latency services using, e.g., distributed computing or mobile edge computing. In another embodiment, the external electronic device 504 may include an internet-of-things (IoT) device. The server 508 may be an intelligent server using machine learning and/or a neural network. According to an embodiment, the external electronic device 504 or the server 508 may be included in the second network 599. The electronic device 501 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 540) including one or more instructions that are stored in a storage medium (e.g., internal memory 536 or external memory 538) that is readable by a machine (e.g., the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 6:
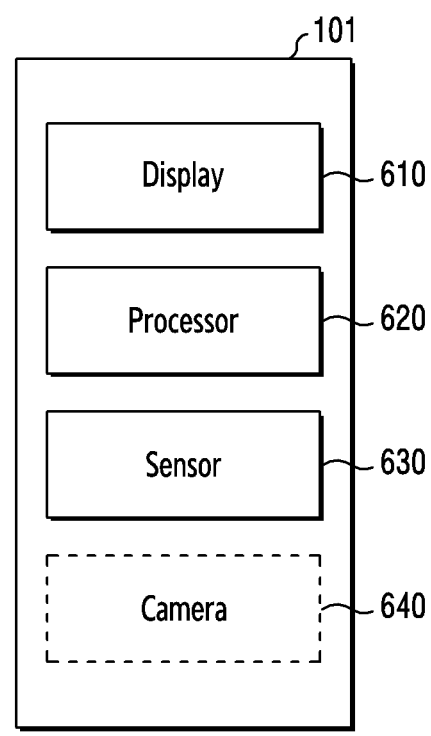
FIG. 6 is a block diagram illustrating the configuration of an electronic device according to an embodiment of the disclosure.

FIG. 6 is a block diagram illustrating the configuration of the electronic device 101 (e.g., the electronic device 100 of FIGS. 1 and 2, the electronic device 30 of FIGS. 3 and 4, or the electronic device 101 of FIG. 5) according to an embodiment of the disclosure.

The electronic device 101 may include a display 610 (e.g., the flexible display 120 of FIGS. 1 and 2, the display 300 of FIGS. 3 and 4, or the display module 560 of FIG. 5), a processor 620 (e.g., the processor 520 of FIG. 5), and a sensor 630 (e.g., the sensor module 576). FIG. 6 is for explaining embodiments of the components of the electronic device 101, and the components included in the electronic device 101 are not limited to the components shown in FIG. 6. For example, the components of the electronic device 101 shown in FIG. 6 may be replaced with other components or additional components may be included in the electronic device 101. For example, the electronic device 101 according to various embodiments may further include a camera 640 (e.g., the camera module 580 of FIG. 5). For another example, the processor 220 of the electronic device 101 according to various embodiments may be replaced so that data may be processed by an external device outside the electronic device 101 by using cloud computing technique and the components of the electronic device 101 may be controlled.

According to various embodiments, the processor 620 may execute instructions loaded into a memory (e.g., the memory 530 of FIG. 5) to control the operations of the components (e.g., the display 610) of the electronic device 101. The processor 620 may execute instructions included in software to control at least one other component operatively connected to the processor 620. The processor 620 may acquire instructions and interpret the acquired instructions to process data or perform calculations. It may be understood that the operation of the electronic device 101 mentioned in this document is performed by the processor 220 executing instructions.

The display 610 may visually display (may also be referred to as provide or output) an image. For example, the processor 620 of the electronic device 101 may display an application execution screen or a keypad screen through the display 610. When the display 610 is a device having a touch sensor capable of detecting a contact of an object, the processor 620 may receive a touch input for a screen displayed on the display from the touch sensor of the display 610. The touch input may include, for example, a coordinate value indicating a type of a touch event and a location where the touch input is received. However, the type of the touch input is not limited thereto.

The electronic device 101 according to various embodiments may expand or reduce the display region of the display 610. The display region may refer to a region where the screen is displayed on the display 610. For example, only a first portion 121 of the display 120 may be exposed to the outside in a first state, and the processor of the electronic device 100 shown in FIG. 1 may determine the first portion 121 as the display region where the screen is displayed. In the second state shown in FIG. 2, the processor of the electronic device 100 may determine a region obtained by combining the first portion 121 and the second portion 122 inserted into the housing as the display region. For another example, in a state in which the electronic device 30 shown in FIGS. 3 and 4 utilizes the sub display 390 as the display region in the state shown in FIG. 4 to display the screen, the display 300 may be utilized as the display region to display the screen as the state of the electronic device 30 is switched to the flat state shown in FIG. 3.

The sensor 630 may include a sensor for detecting the expansion of the display region. In this document, the detecting of the expansion of the display region may mean detecting an operation to expand the display region. For example, the sensor 630 may be configured to detect the mechanical operation of the electronic device 100 shown in FIGS. 1 and 2 and detect deformation between the first state and second state. For another example, the sensor 630 may include a Hall sensor for detecting transition from the folded state of FIG. 4 to the flat state of FIG. 3. As another example, the electronic device 101 may include a hardware button (not shown) that allows the mechanical operation to be performed. When the user presses the hardware button, the mechanical operation may occur from the first state of FIG. 1 to the second state of FIG. 2 or from the folded state of FIG. 4 to the flat state of FIG. 3. The sensor 630 may be a component for detecting that the hardware button is pressed. As another example, the electronic device 101 may display a software button through the display 610 to allow the expansion of the display. The processor 620 may determine that the display region is expanded when a user input (e.g., a touch input or a mouse click) for selecting the software button is received. That is, the electronic device 101 according to various embodiments may be configured to detect the expansion of the display region without including the sensor 630 as a separate hardware configuration.

The processor 620 may display a screen on at least a portion of the display region of the display 610. For example, the processor 620 may execute a messenger application installed in the electronic device 101 and display an execution screen of the messenger application on at least a portion of the display region. The processor 620 may receive a user input for the displayed screen. For example, when the display 610 includes a touch screen with a touch sensor, the electronic device may receive a touch input to a text input field included in the execution screen of the messenger application. The text input field may refer to an area in which text input by a user is displayed. The user input may be used in various forms according to embodiments. For example, the user input may include at least one of a tap input, that is a touch input with a short holding period, a long press input with a holding period longer than a designated period, a swipe input in which a touch input passes the position of an object displayed on the screen while the touch input is held, a drag and drop input in which a touch position moves from the position of an object to an end point, or a voice input for recognizing a user's voice received through a microphone (e.g., the input module 550 of FIG. 5).

In response to the expansion of the display region being identified through the sensor 630, the processor 620 according to various embodiments may determine a user interface (UI) component based on a user input received before the display region is expanded. For example, when the user input is an input for selecting a text input field, the processor 620 may select a UI component including a keypad. The UI component may be referred to as a component constituting an input UI. For example, the UI component may include at least one of a virtual keypad area for receiving a text input, a voice input status display area related to an operation of receiving a voice input, a handwriting input area for receiving a user's handwriting input, an image list area for selecting an image stored in the electronic device, or a preview area for inputting an image captured through the camera 640. The processor 620 may display the input UI including the determined UI component on at least a portion of the expanded display region of the display 610.

Figure 7:
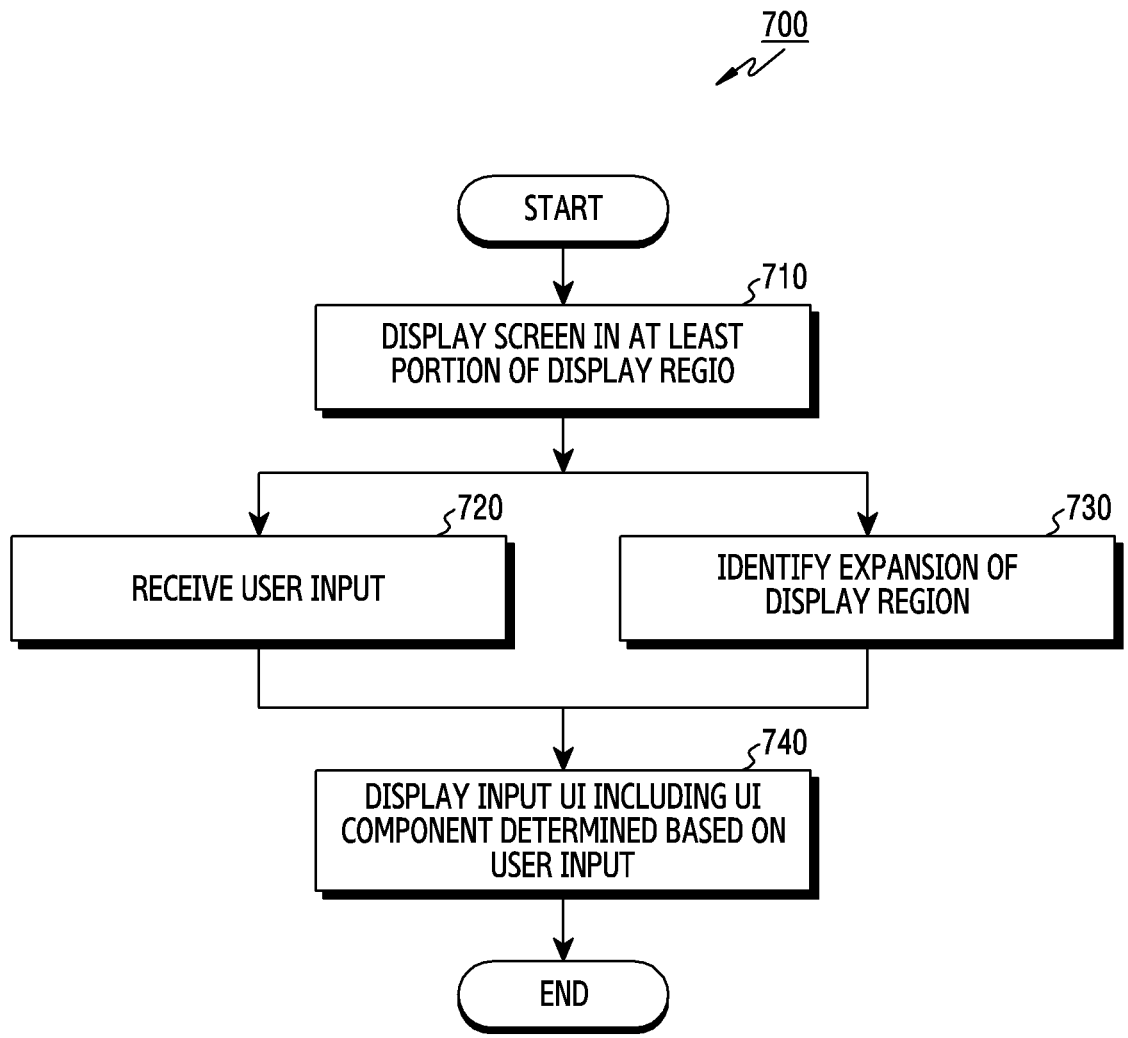
FIG. 7 is a flowchart illustrating a process of providing a user interface by an electronic device according to an embodiment of the disclosure.

FIG. 7 is a flowchart 700 illustrating a process in which an electronic device (e.g., the electronic device 100 of FIGS. 1 and 2, the electronic device 30 of FIGS. 3 and 4, the electronic device 101 of FIG. 5, or the electronic device 101 of FIG. 6) provides a UI according to an embodiment of the disclosure.

The electronic device may perform operation 710 of displaying a screen on at least a portion of the display region of the display. According to various embodiments, the screen displayed in operation 710 may include an object related to a function provided by the electronic device. For example, the electronic device may display a screen including at least one of an input field for displaying information input by a user input, a keypad for inputting text, an emoticon list for inputting emoticons, or a photo input icon for inputting photos.

The electronic device may perform operation 720 of receiving a user input. For example, the user input of operation 720 may be an input for selecting an object included in the screen displayed in operation 710. The user input of operation 720 may be generated based on another interaction between the electronic device and the user. The electronic device may perform operation 730 of identifying the expansion of the display region. For example, as the state of the electronic device transitions from the first state of FIG. 1 to the second state of FIG. 2, the electronic device may identify whether an area where the screen is displayed on the display is expanded.

In response to the expansion of the display region being identified, the electronic device may perform operation 740 of displaying an input UI. Operation 740 may include an operation of determining a UI component based on a user input and configuring an input UI including the determined UI component. According to an embodiment, the UI component included in the input UI may be an expansion of an object selected by a user input. For example, when the display region is expanded after receiving a user input for selecting a text input field, the electronic device may display an input UI including a keypad for inputting text and the expanded text input field on the display.

Figure 8:
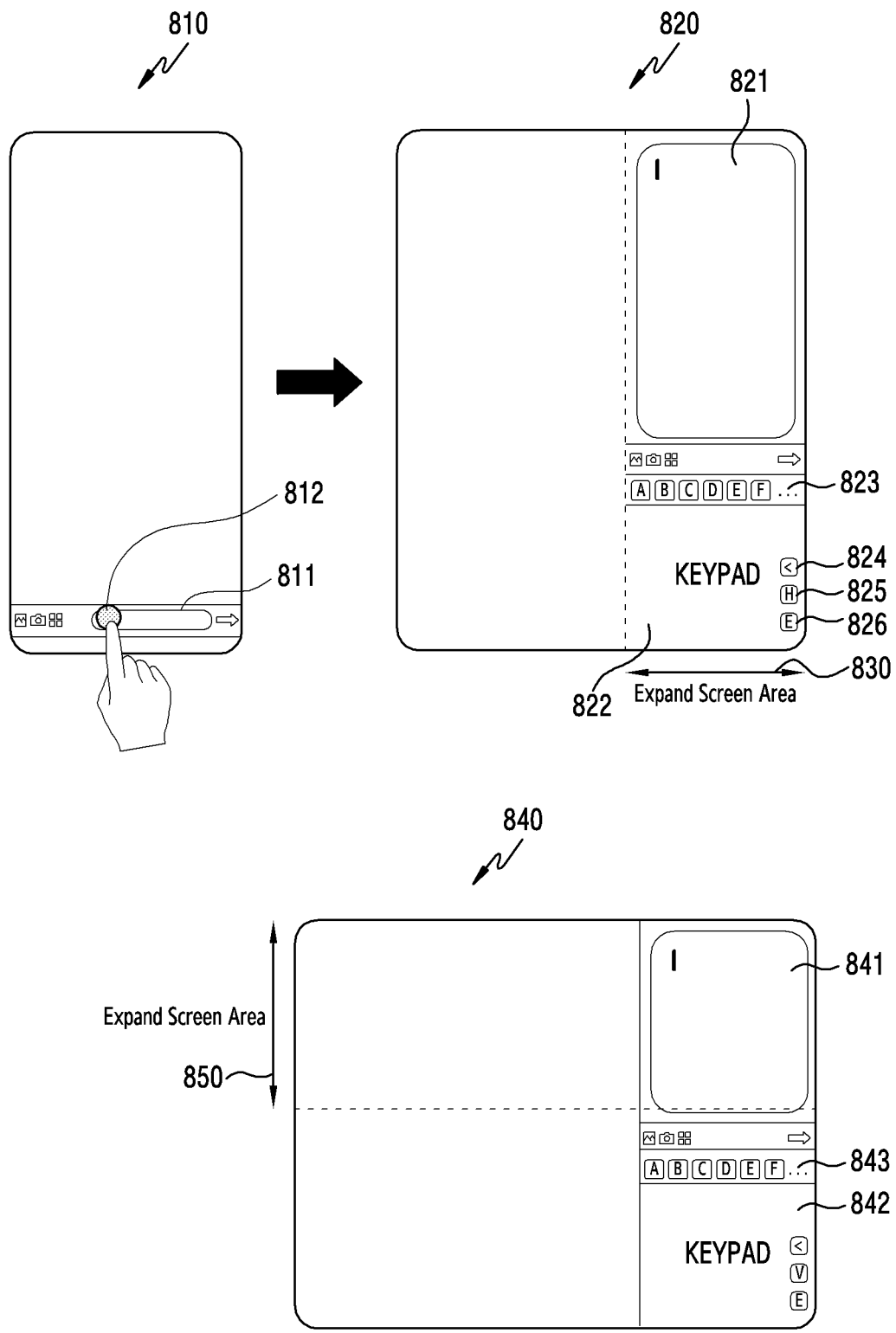
FIG. 8 is a diagram illustrating an example of a screen output by an electronic device in response to interaction with a user and an expansion of a display region according to an embodiment of the disclosure.

FIG. 8 is a diagram illustrating an example of a screen output by an electronic device (e.g., the electronic device 100 of FIGS. 1 and 2, the electronic device 30 of FIGS. 3 and 4, the electronic device 101 of FIG. 5, or the electronic device 101 of FIG. 6) in response to interaction with a user or an expansion of a display region according to an embodiment of the disclosure.

The electronic device may display a screen 810 including a text input field 811 through a display. The electronic device may identify an expansion of the display region after a touch input 812 for selecting the text input field 811 is received or while the touch input 812 is being received.

In response to the identified expansion of the display region, the electronic device may display a screen 820 including an input UI. The electronic device may display an input UI including a UI component determined based on a user input on the expanded display region. According to an embodiment, the determined UI component may include an expanded text input field 821 and a keypad 822 for inputting text. According to various embodiments, the UI component may further include at least one of a toolbar 823, a location change button 824, a mode change button 825, and an edit button 826. The input UI including the UI component determined based on the user input may refer to a UI expanded based on the user input. The fact that the UI is expanded may include, for example, at least one of increasing the size of the selected UI component, displaying an expanded image, further displaying additional information, or further displaying an additional UI component. For example, when the display region is expanded in 810 while the text input field 811 displayed before the expansion is selected, the electronic device may display an input UI including the expanded text input field 821. For another example, the electronic device may display a screen that further includes the toolbar 823 for adding an additional UI component to the input UI in response to the expansion of the display region.

The toolbar 823 may provide a list of functions to be provided through the input UI. When at least one function is selected from the list of functions by the user, the electronic device may add at least one UI component to provide the selected at least one function to the input UI.

The location change button 824 may be used to change a location where the input UI is displayed. For example, when a user input for selecting the location change button 824 is received while the input UI is displayed on the right area of the display of the electronic device, the electronic device may move the location where the input UI is displayed to the left area.

The mode change button 825 may be used to switch a display mode (e.g., landscape mode or portrait mode) of the input UI. For example, the screen 820 of FIG. 8 may be a screen on which the input UI is displayed in the landscape mode, and when the mode change button 825 is selected, the electronic device may display the input UI horizontally in the area at the bottom of the screen.

The edit button 826 may be used to edit the configuration of the input UI. For example, when a user input for selecting the edit button 826 is received, the electronic device may execute an edit mode for the input UI. The electronic device may display at least one of a divide handler and a reduction/expansion handler (scale handler) in the edit mode. The electronic device may change the size of an area where the input UI is displayed or the size of an area where UI components are displayed within the input UI based on a drag and drop input to at least one of the divide handler and the scale handler. The electronic device may change a location where the UI component is arranged within the input UI based on the user input in the edit mode. The electronic device may remove the UI component included in the input UI or add the UI component to the input UI based on the user input in the edit mode.

According to various embodiments, the input UI may be displayed within the expanded region 830. According to another embodiment, the input UI may be displayed in another area. For example, as shown in the screen 820, when the input UI is displayed in the user input for selecting the mode change button 825 while being displayed in the portrait mode, the input UI may be displayed in the landscape mode horizontally displayed at the bottom of the screen 820.

The electronic device may display an input UI including at least one of the text input field 841, the keypad 842, and the toolbar 843 when the display region is expanded, in 850, even on the screen 840 displayed horizontally.

Figure 9:
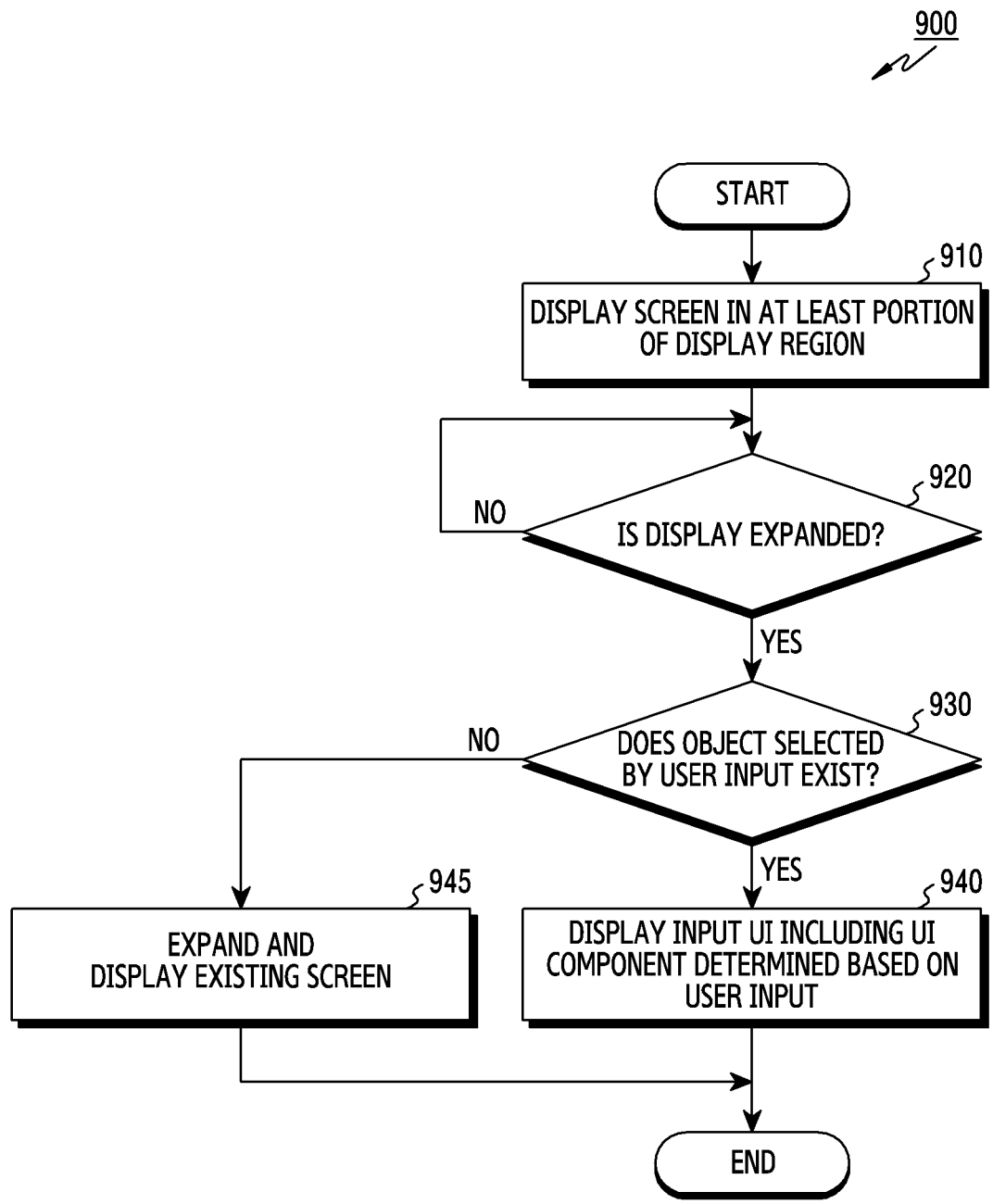
FIG. 9 is a flowchart illustrating a process in which an electronic device provides a user interface based on an object selected by a user input according to an embodiment of the disclosure.

FIG. 9 is a flowchart 900 illustrating a process in which an electronic device (e.g., the electronic device 100 of FIGS. 1 and 2, the electronic device 30 of FIGS. 3 and 4, the electronic device 101 of FIG. 5, or the electronic device 101 of FIG. 6) provides a UI based on an object selected by a user input according to an embodiment of the disclosure.

The electronic device may provide an input UI based on the presence or absence of interaction with the user. The electronic device may perform operation 910 of displaying a screen on at least a portion of the display region of the display. According to various embodiments, the screen displayed in operation 910 may include an object related to a function provided by the electronic device. For example, the electronic device may display a screen including at least one of an input field for displaying information input by a user input, a keypad for inputting text, an emoticon list for inputting emoticons, and a photo input icon for inputting photos.

The electronic device may perform operation 920 of determining whether the display region is expanded. When the display region is expanded, the electronic device may perform operation 930 of determining whether an object selected by a user input exists. For example, when the expansion of the display region is identified after a user input for a text input field displayed on the screen is received or while the user input is maintained, the electronic device may determine that the object selected by the user input exists. The selected object may include a UI object related to the function provided by the electronic device. The UI object may include, for example, at least one of an input field for displaying input information (e.g., text, image, or emoticon), a virtual keypad for inputting text, a voice reception status display object indicating whether an operation for receiving a voice input is being performed, a handwriting input area for receiving a handwriting input, an emoticon list for selecting an emoticon, a thumbnail list for selecting an image, and a preview image for camera shooting, but the UI object is not limited thereto.

When it is determined by the user input that there is the object selected by the user input in the screen displayed in operation 910, the electronic device may determine a UI component based on the selected object. The electronic device may perform operation 940 of displaying an input UI including the determined UI component. According to various embodiments, the UI component included in the input UI and displayed in operation 940 may be expanded and displayed in a wider area than when displayed on the screen displayed in operation 945. When it is determined by the user input that there is no object selected by the user input in the screen displayed in operation 910, the electronic device may expand and display the screen before the display region is expanded.

Figure 10:
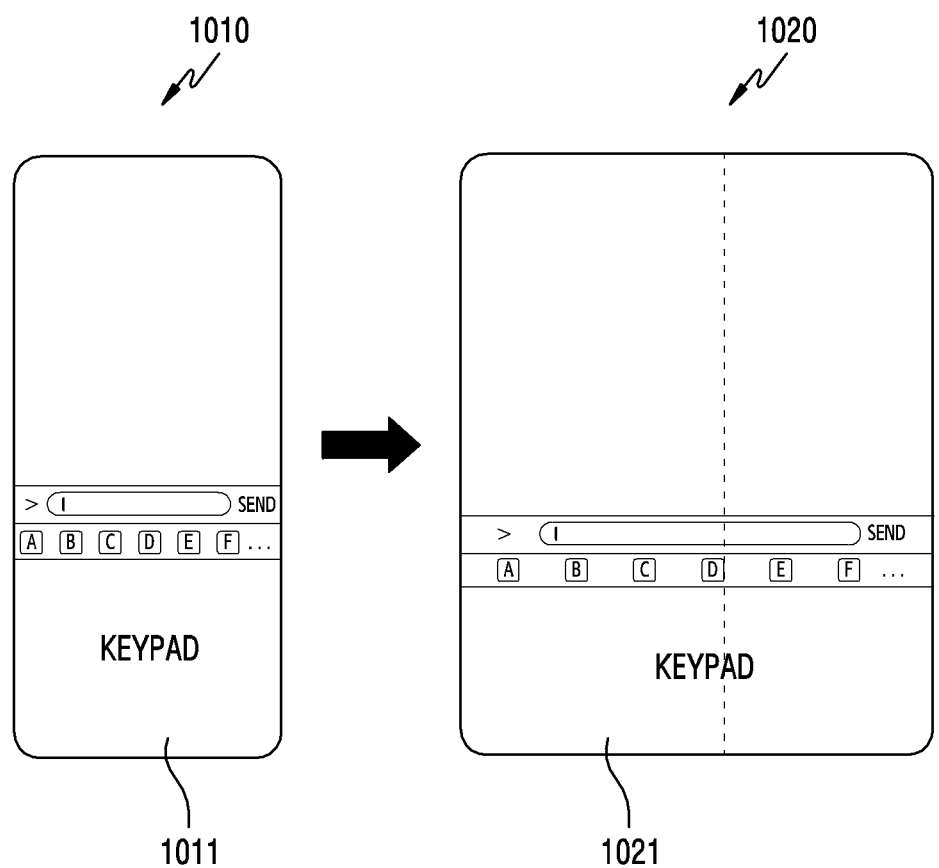
FIG. 10 is a diagram illustrating an example of a screen that an electronic device outputs as a display region is expanded without interaction with a user according to an embodiment of the disclosure.

FIG. 10 is a diagram illustrating an example of a screen output by an electronic device (e.g., the electronic device 100 of FIGS. 1 and 2, the electronic device 30 of FIGS. 3 and 4, the electronic device 101 of FIG. 5, or the electronic device 101 of FIG. 6) as the display region is expanded without interaction for selecting an object with a user according to an embodiment of the disclosure.

The electronic device according to various embodiments may display a UI on a display. For example, the electronic device may display a screen 1010 including a virtual keypad 1011 for receiving text. When the expansion of the display region is identified while the screen 1010 is displayed, the electronic device may display a screen 1020 scaled in a direction in which the display region is expanded while the layout of the UI including the virtual keypad 1021 is maintained. For example, as shown in FIG. 10, when the display region is expanded in the horizontal direction, the electronic device may expand and display the screen in the horizontal direction.

Figure 11:
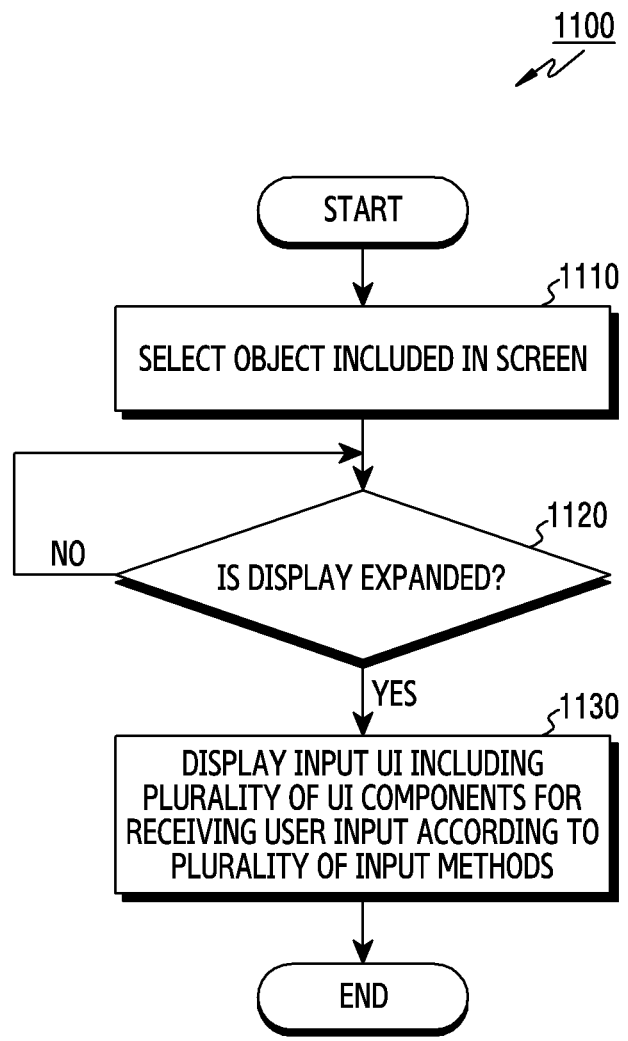
FIG. 11 is a flowchart illustrating a process in which an electronic device provides an input UI for receiving a multi-modal input according to an embodiment of the disclosure.

FIG. 11 is a flowchart 1100 illustrating a process in which an electronic device (e.g., the electronic device 100 of FIGS. 1 and 2, the electronic device 30 of FIGS. 3 and 4, the electronic device 101 of FIG. 5, or the electronic device 101 of FIG. 6) provides an input UI for receiving a multi-modal input according to an embodiment of the disclosure.

The electronic device may perform operation 1110 of displaying a screen on the display region and selecting at least one of objects included in the screen. For example, the electronic device may receive a touch input at a location where the object is displayed. The selected object may include a UI object related to a function provided by the electronic device. The electronic device according to an embodiment may select a plurality of UI objects based on a user input. For example, the electronic device may select a voice input button for executing a voice input function and a keypad for inputting text.

The electronic device may perform operation 1120 of identifying whether the display region is expanded. When the expansion of the display region is identified, the electronic device may perform operation 1130 of displaying an input UI for receiving a user input using an input method corresponding to one or more selected UI objects. When there are a plurality of types of input methods corresponding to the one or more selected UI objects, the input UI may include a plurality of input UIs for receiving user input through the plurality of input methods. The user input made through the plurality of input methods may be referred to as a multi-modal input. For example, the electronic device may display an input UI including a UI component for receiving a voice input and a UI component for receiving text on the display.

Referring to FIG. 11, although operation 1110 is performed before operation 1120, operation 1110 may be performed after operation 1120. For example, in a state where the display is expanded to display an input UI including an input field and a keypad, the user input for selecting the voice input button included in the toolbar may be received. In response to the selection of the voice input button, the electronic device may add a UI component related to the operation of receiving the voice input to the input UI and may display the result.

Figure 12:
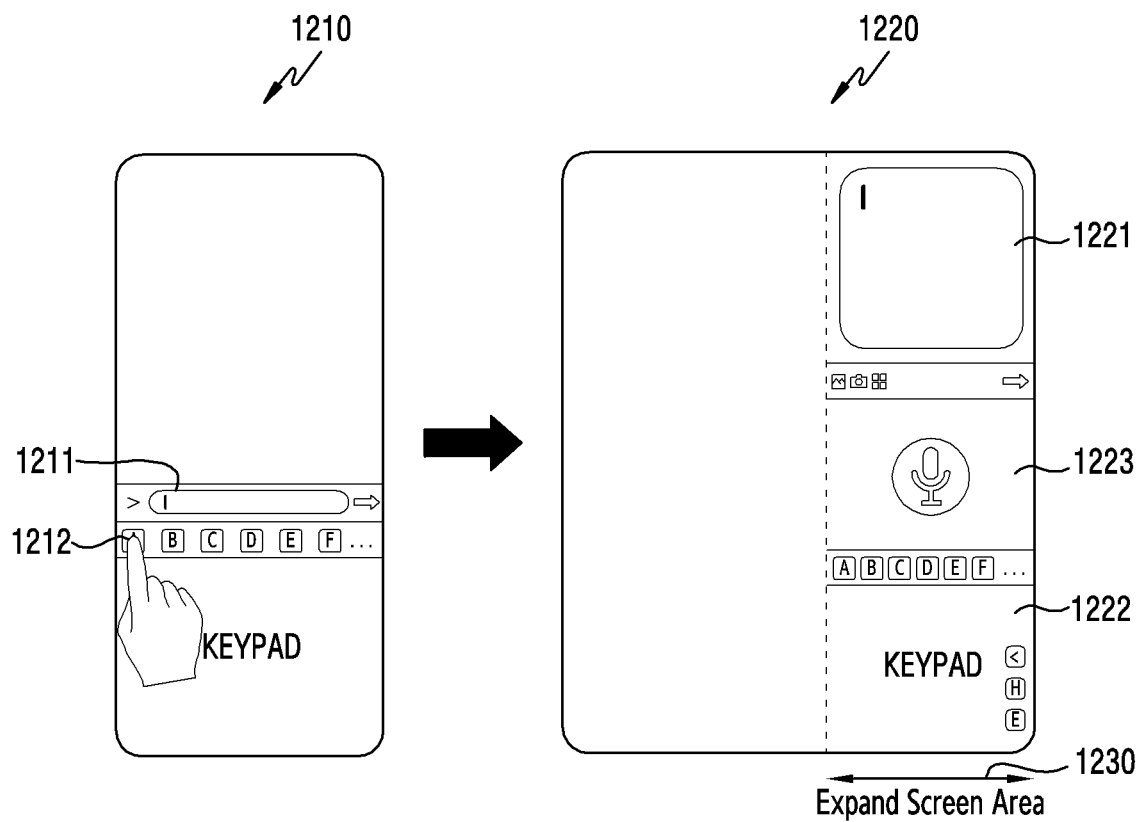
FIG. 12 is a diagram illustrating an example of a screen displayed by an electronic device to receive a complex modal input according to an embodiment of the disclosure.

FIG. 12 is a diagram illustrating an example of a screen displayed by an electronic device (e.g., the electronic device 100 of FIGS. 1 and 2, the electronic device 30 of FIGS. 3 and 4, the electronic device 101 of FIG. 5, or the electronic device 101 of FIG. 6) to receive a multi-modal input according to an embodiment of the disclosure.

The electronic device may display a screen 1210 including an input field 1211 displaying input information and a voice input button 1212. The electronic device may receive a user input for selecting the input field 1211 and a user input for selecting the voice input button 1212. When a display region 1230 is expanded while the input field 1211 and the voice input button 1212 are selected, the electronic device may display a screen 1220 including the input UI on the expanded display region. The input UI displayed on the screen 1220 may include an expanded input field 1221, a voice input related UI 1223, and a virtual keypad 1222.

The electronic device may provide an input UI including a plurality of UI components for receiving a user input according to the plurality of input methods as shown in the screen 1220 of FIG. 12, thereby providing a UI allowing the user to easily use a multi-modal input method.

Figure 13:
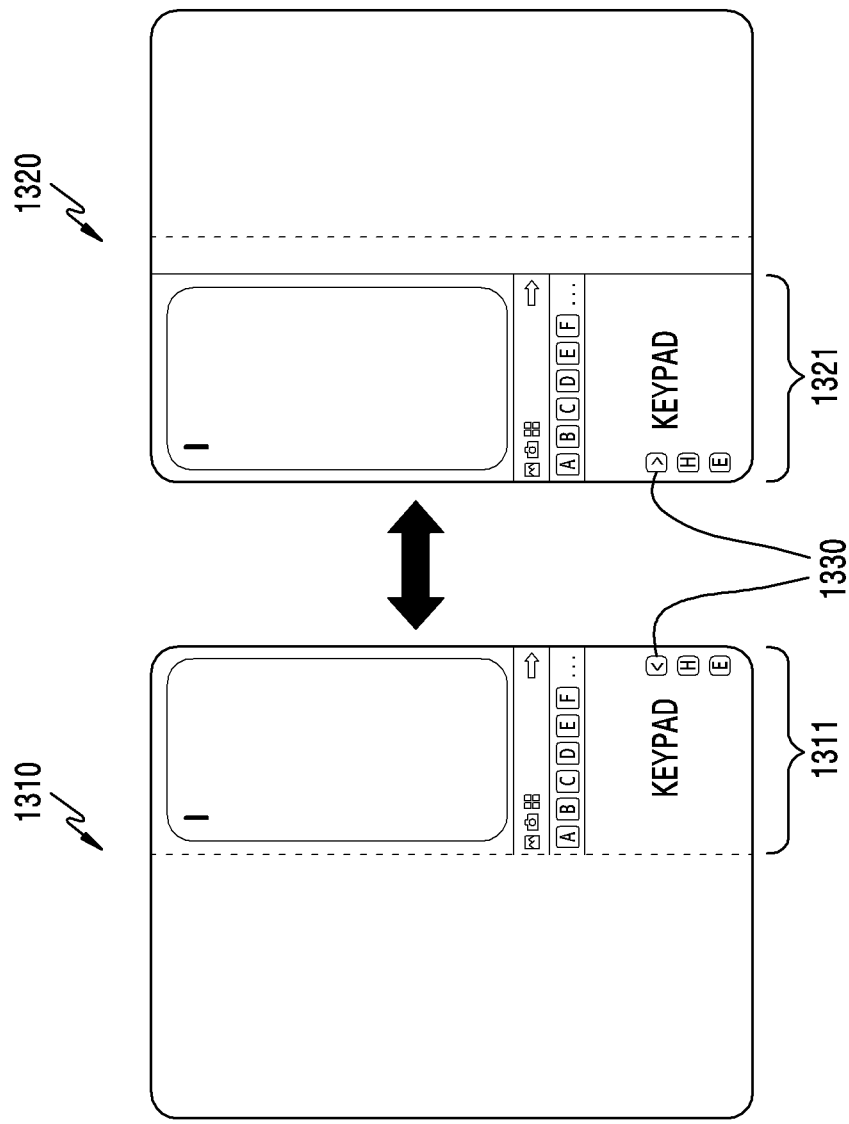
FIG. 13 is a diagram illustrating an example in which an electronic device switches a location where an input UI is displayed according to an embodiment of the disclosure.

FIG. 13 is a diagram illustrating an example of switching a location where an input UI is displayed by an electronic device (e.g., the electronic device 100 of FIGS. 1 and 2, the electronic device 30 of FIGS. 3 and 4, the electronic device 101 of FIG. 5, or the electronic device 101 of FIG. 6) according to an embodiment of the disclosure.

The electronic device may display a screen 1310 on which an input UI is displayed on a right area 1311 of the display region through the display. The input UI may include a location change button 1330 for moving the location of the input UI displayed on the right area 1311.

In response to a user input for selecting the location change button 1330 displayed on the screen 1310, the electronic device may display a screen 1320 on which the input UI is disposed on the left area 1321. In response to a user input for selecting the location change button 1330 of the input UI disposed on a left area 1321, the electronic device may display the screen 1310 on which the input UI is disposed on the right area 1311 again.

Figure 14:
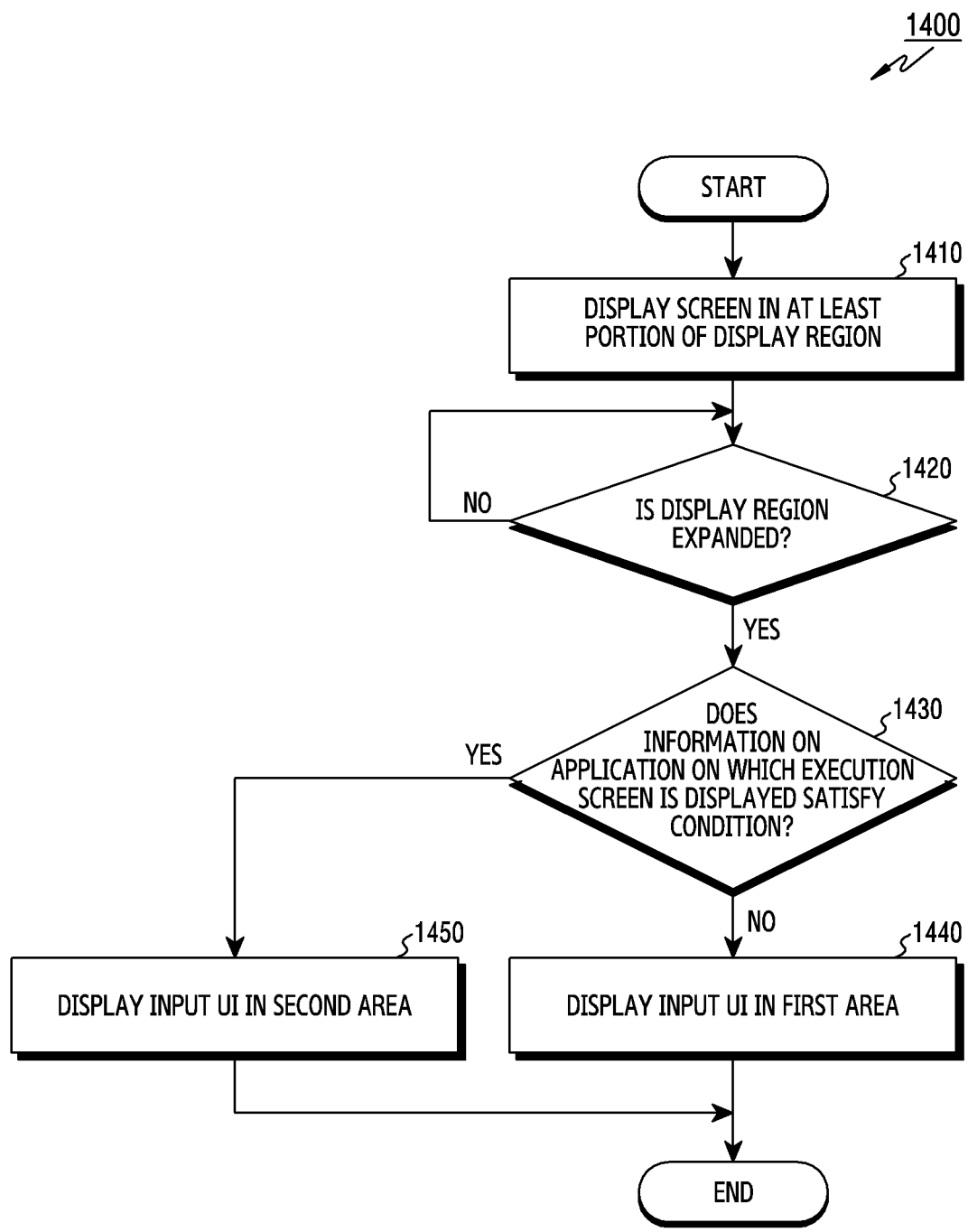
FIG. 14 is a flowchart illustrating a process of providing an input UI based on a state in which an electronic device is executing an application according to an embodiment of the disclosure.

FIG. 14 is a flowchart 1400 illustrating a process in which an electronic device (e.g., the electronic device 100 of FIGS. 1 and 2, the electronic device 30 of FIGS. 3 and 4, the electronic device 101 of FIG. 5, or the electronic device 101 of FIG. 6) provides an input UI based on a state in which an application is being executed according to an embodiment of the disclosure.

The electronic device may provide an input UI based on a usage state. For example, when an application being executed by the electronic device is an application that provides a landscape mode screen, the electronic device may display an input UI on a lower area of the screen displayed on the display region. In this document, the landscape mode may refer to an operation mode in which a downward direction of an image displayed on the screen is arranged and displayed on a side surface with a longer length of the electronic device. The portrait mode may refer to an operation mode in which the downward direction of the image displayed on the screen is arranged and displayed on the side surface with a short length of the electronic device.

The electronic device may perform operation 1410 of displaying the screen on at least a portion of the display region. The screen displayed in operation 1410 may include an execution screen displayed as an execution result of at least one application. When displaying execution screens for a plurality of applications, the electronic device may divide the display region into a plurality of areas and display the respective execution screens.

The electronic device may perform operation 1420 of identifying expansion of the display region. The electronic device may provide an input UI based on the state of the electronic device at the time when the expansion of the display region is identified. In response to the expansion of the display region, the electronic device according to an embodiment may perform operation 1430 of determining whether information about the application on which the execution screen is displayed satisfies a condition. For example, the electronic device may determine whether the application on which the execution screen is displayed is a designated application (e.g., a video playback application). For another example, the electronic device may determine whether the designated application is operating in a designated operating mode (e.g., an operating state of playing a video in full screen). For another example, the electronic device may determine whether the execution screens of the plurality of applications are being displayed in a plurality of windows.

When it is determined that the information about the application on which the execution screen is displayed does not satisfy the condition, the electronic device may perform operation 1440 of displaying the input UI in a first area. For example, the electronic device may display the input UI in an area (e.g., the expanded region 830 of FIG. 8) configured as default. When it is determined that the information about the application on which the execution screen is displayed satisfies the condition, the electronic device may perform operation 1450 of displaying the input UI in a second area. The second area may be an area determined based on the operating state of the electronic device.

Figure 15:
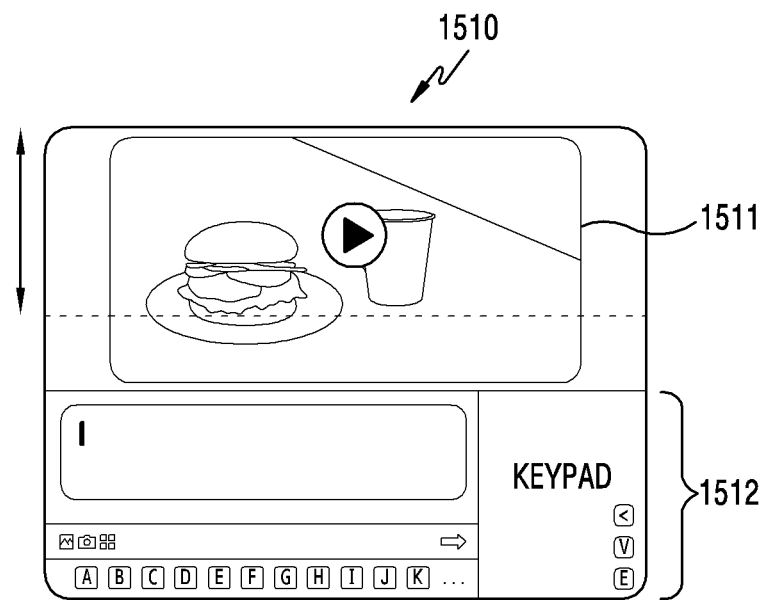
FIG. 15 is a diagram illustrating an example of a screen displayed to provide an input UI based on a state in which an electronic device is executing an application according to an embodiment of the disclosure.
Figure 15:
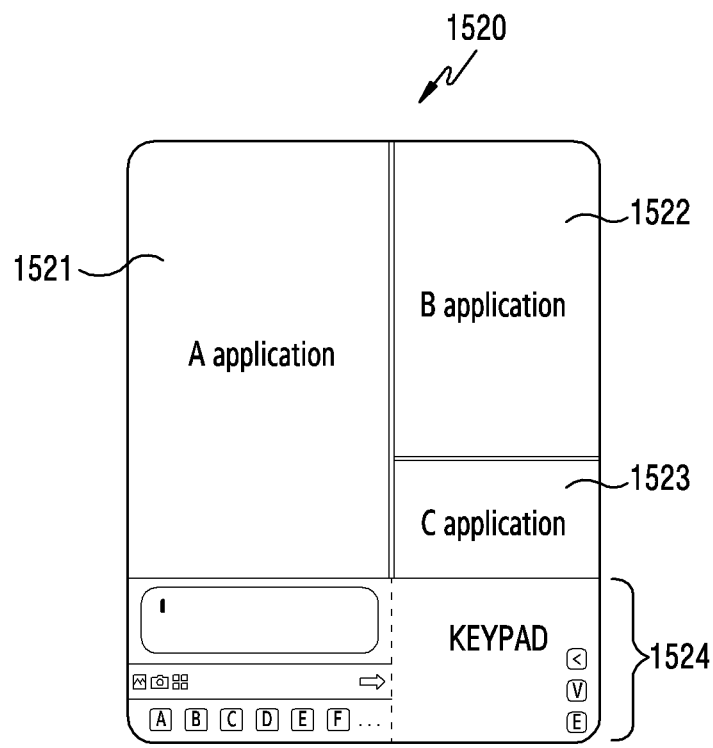

FIG. 15 is a diagram illustrating an example of a screen displayed by an electronic device (e.g., the electronic device 100 of FIGS. 1 and 2, the electronic device 30 of FIGS. 3 and 4, the electronic device 101 of FIG. 5, or the electronic device 101 of FIG. 6) to provide an input UI based on a state in which an application is being executed according to an embodiment of the disclosure.

Referring to FIG. 15, when the electronic device reproduces video content having a long horizontal direction on the entire screen, the electronic device may display a screen in a landscape mode. When the electronic device executes a video application in a first area 1511 and the display region is expanded while the video content is being reproduced, the electronic device may display a screen 1510 displaying an input UI arranged horizontally on a second area 1512.

For another example, when the electronic device is in a state of displaying execution screens of a plurality of applications, the electronic device may display an input UI on a lower area of the screen displayed on the display region. Referring to FIG. 15, when the electronic device vertically displays the input UI on the right side of the display region as shown in the screen 820 of FIG. 8 while displaying each application execution screen on a first area 1521, a second area 1522, and a third area 1523, all or most of the execution screens displayed on the second area 1522 and the third area 1523 may not be displayed within the display region. Alternatively, when the execution screen of the application is reduced by the area of the reduced execution screen as the input UI is displayed, the screen may be distorted or displayed too small. Accordingly, when the expansion of the display region is detected while the execution screens of the plurality of applications are displayed in the plurality of windows, the electronic device may display a screen 1520 including the input UI disposed horizontally in a fourth area 1524.

Figure 16:
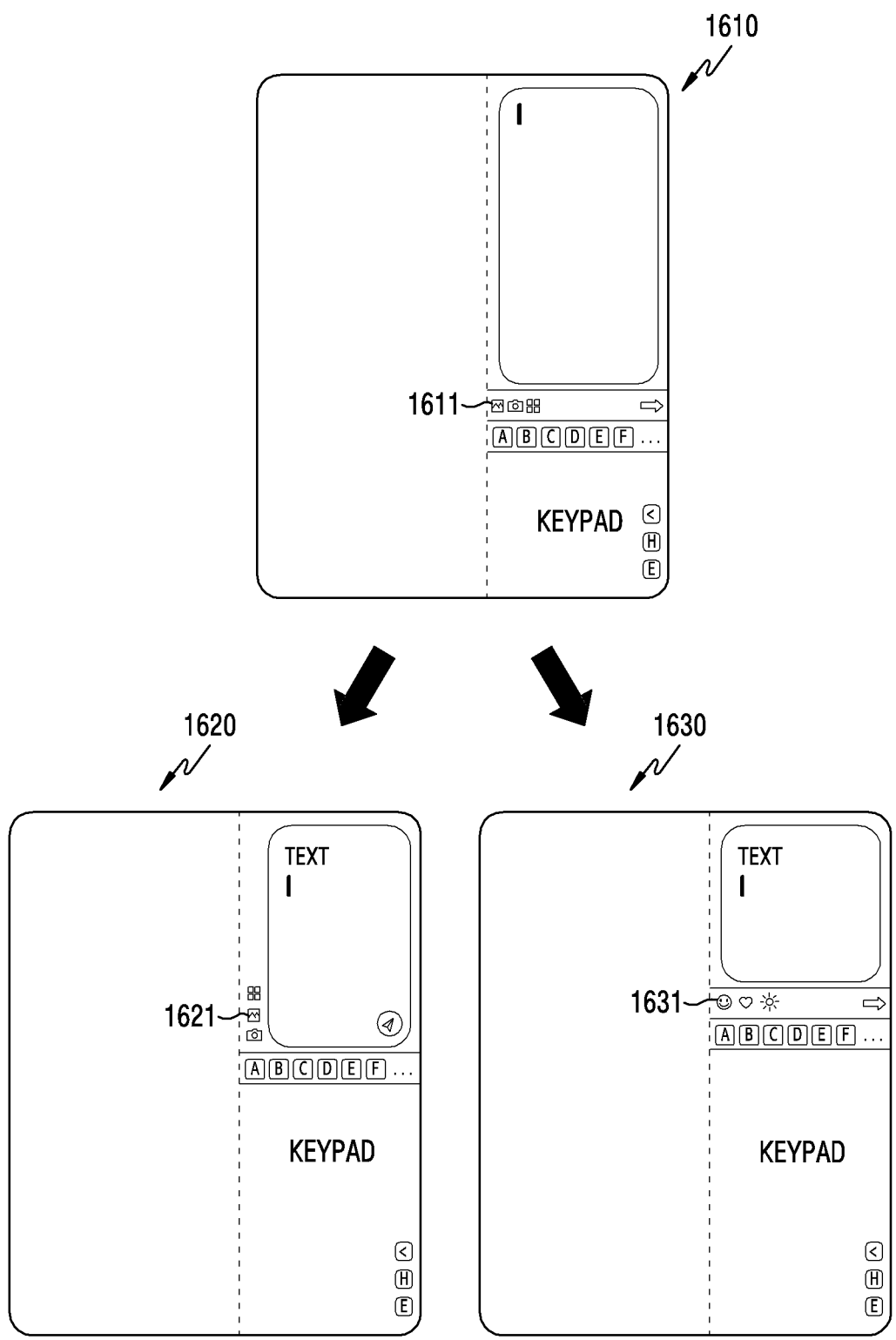
FIG. 16 is a diagram illustrating an example of a screen on which an electronic device displays a changed input UI according to an embodiment of the disclosure.

FIG. 16 is a diagram illustrating an example of a screen in which an electronic device (e.g., the electronic device 100 of FIGS. 1 and 2, the electronic device 30 of FIGS. 3 and 4, the electronic device 101 of FIG. 5, or the electronic device 101 of FIG. 6) provides a changed input UI according to an embodiment of the disclosure.

When an operating system or an application providing an input UI is updated, the electronic device may change the configuration of an input field (e.g., design, layout, or function provided by an input area). In the electronic device according to various embodiments, as the display region is expanded even if the configuration of the input field is changed, the operation of providing the input UI may be performed in the same manner.

Referring to FIG. 16, the electronic device may display a screen 1610 including an input UI configured using a UI component including a function button 1611. According to various embodiments, when the layout or design of an input field is changed due to an update of the operating system of the electronic device or the application that provides the input UI, the electronic device may include an input area 1621 in which the layout or design is changed, but may display a screen 1620 identically including the remaining UI components. When a function button 1611 is changed to another function button 1631 due to the update of the operating system of the electronic device according to various embodiments or the application providing the input UI, the electronic device may display a screen 1630 including an input UI including the other function button 1631 instead of the function button 1611.

Figure 17:
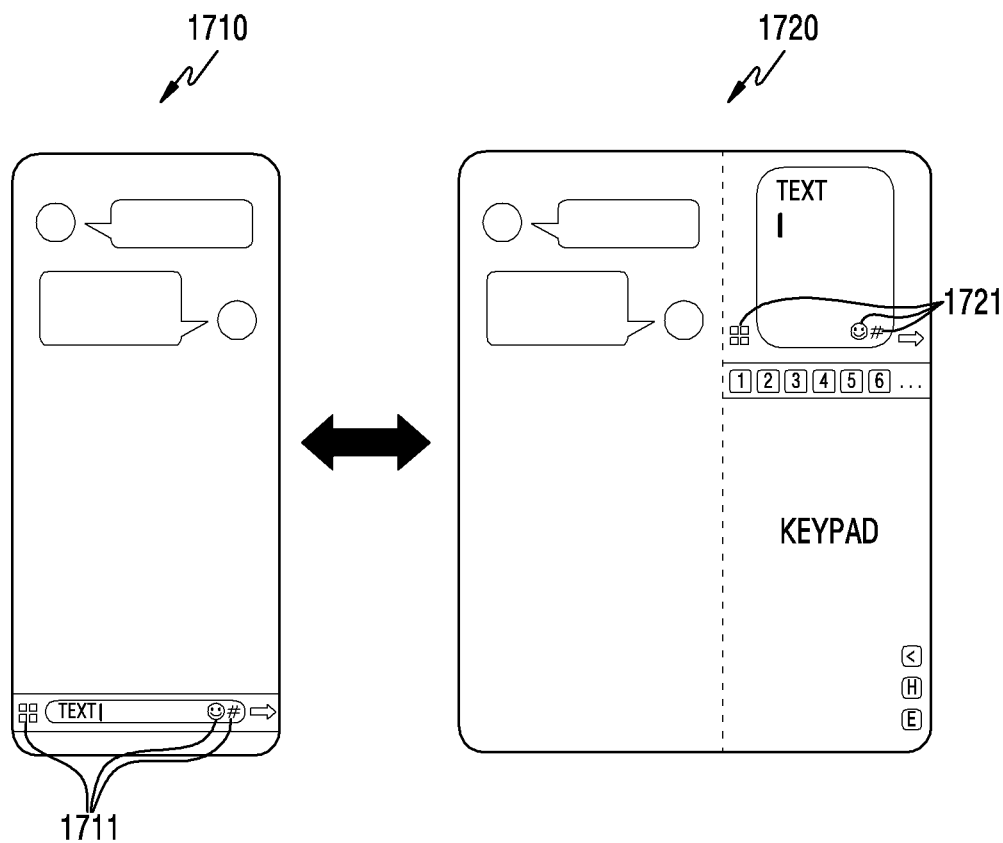
FIG. 17 is a diagram illustrating an example of a screen displayed to provide an input UI configured based on a layout of an application being executed by an electronic device according to an embodiment of the disclosure.

FIG. 17 is a diagram illustrating an example of a screen displayed by an electronic device (e.g., the electronic device 100 of FIGS. 1 and 2, the electronic device 30 of FIGS. 3 and 4, the electronic device 101 of FIG. 5, or the electronic device 101 of FIG. 6) to provide an input UI configured based on the layout of an application being executed by the electronic device according to an embodiment of the disclosure.

When a third party application provided by a third party includes an input field, the electronic device may configure an input UI based on a layout provided by the input field of the third party application in response to identification of an expansion of the display region while the third application is being executed.

Referring to FIG. 17, the electronic device may display an execution screen 1710 of an instant messenger including function buttons 1711 in the input field. When the expansion of the display region is identified while the execution screen 1720 of the instant messenger is displayed, the electronic device may display the input UI including the function buttons 1721 included in the input field of the instant messenger within the expanded display region.

Figure 18:
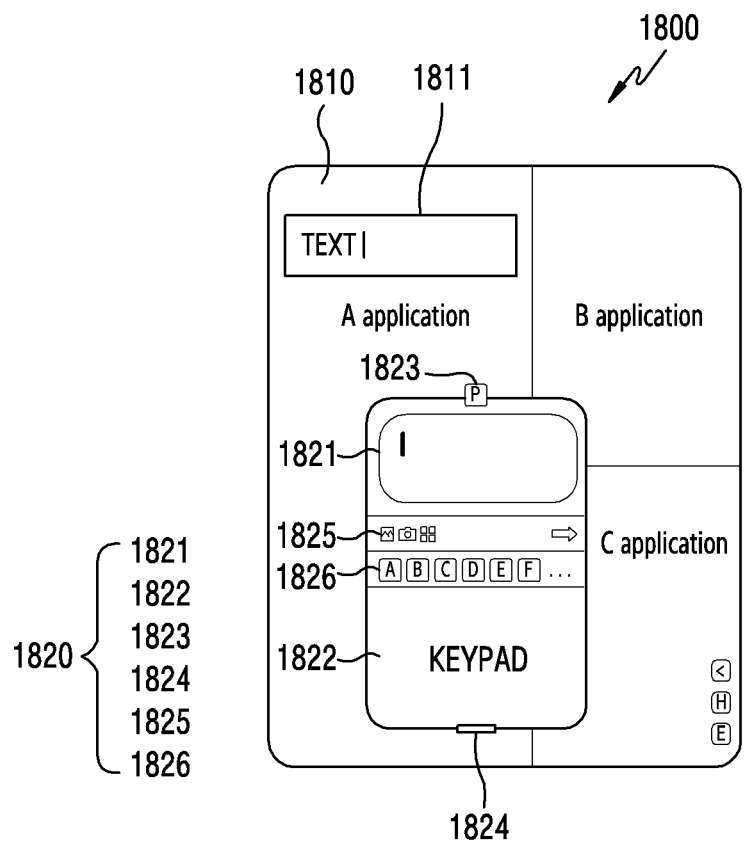
FIG. 18 is a diagram illustrating an example of a screen displayed by an electronic device to provide an input UI in the form of a floating UI according to an embodiment of the disclosure.

FIG. 18 is a diagram illustrating an example of a screen displayed by an electronic device (e.g., the electronic device 100 of FIGS. 1 and 2, the electronic device 30 of FIGS. 3 and 4, the electronic device 101 of FIG. 5, or the electronic device 101 of FIG. 6) to provide an input UI in the form of a floating UI according to an embodiment of the disclosure.

The floating UI refers to a UI in which an input UI is overlapped and displayed on a screen, and the position of the input UI can freely move within the screen. The electronic device may display a screen 1800 including the floating UI. As an example of the floating UI, referring to FIG. 18, an input UI 1820 may include at least one of an input field 1821, a UI component (e.g., a keypad area) 1822, a pin button 1823, a handler 1824, an input function button 1825, or a toolbar 1826. The electronic device may configure the position of the input UI 1820 not to move or configure to move the position of the input UI 1820 based on a user input for selecting the pin button 1823. The electronic device may move the position of the input UI 1820 based on a user input (e.g., drag and drop) for selecting and moving the handler 1824.

According to an embodiment, when the execution screens of a plurality of applications are displayed, the electronic device may display an application to receive a user input received through the input UI 1820 to be distinguished from other applications. For example, a periphery of an area where the application to receive the user input is displayed may be displayed in a different color.

The components of the input UI 1820 are not limited to the configuration shown in FIG. 18. For example, the input field 1821 may not be included in the input UI 1820. The electronic device may highlight and display the input field 1811 included in the execution screen 1810 of the application through which information is input through the input UI 1820. For example, an indicator may be displayed in an area where the input field 1811 is displayed or in the vicinity of the area.

Figure 19:
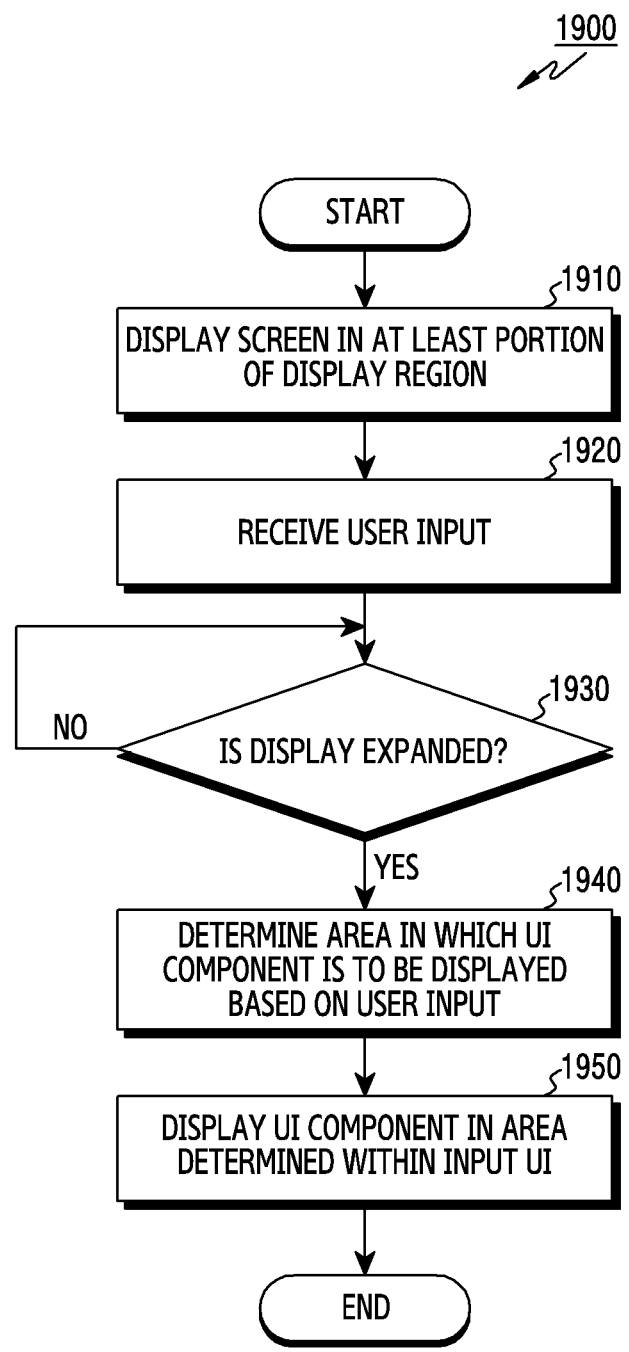
FIG. 19 is a flowchart illustrating a process of configuring and displaying an input UI by an electronic device according to an embodiment of the disclosure.

FIG. 19 is a flowchart 1900 illustrating a process in which an electronic device (e.g., the electronic device 100 of FIGS. 1 and 2, the electronic device 30 of FIGS. 3 and 4, the electronic device 101 of FIG. 5, or the electronic device 101 of FIG. 6) configures and displays an input UI according to an embodiment of the disclosure.

The electronic device may determine an area where a UI component is to be displayed based on a user input. The electronic device may perform operation 1910 of displaying a screen on at least a portion of the display region. In operation 1910, the electronic device may receive a user input for the displayed screen.

The electronic device may perform operation 1930 of identifying an expansion of the display region. The electronic device may perform operation 1940 of determining an area to display the UI component based on the user input received in operation 1920.

For example, in a state where an input area and a keypad are displayed in operation 1910, the electronic device may allow an area where a UI component corresponding to an object selected by a user input is displayed among the input area and the keypad to be displayed on a wide area. For another example, in operation 1920, the electronic device may receive a long press input for the object displayed on the screen, and determine an area where the UI component is to be displayed based on the length of a time period during which the long press input is maintained. (e.g., displayed in a wider area as the time period is longer). The electronic device may perform operation 1950 of displaying the UI component corresponding to the user input in the determined area within the input UI.

Figure 20:
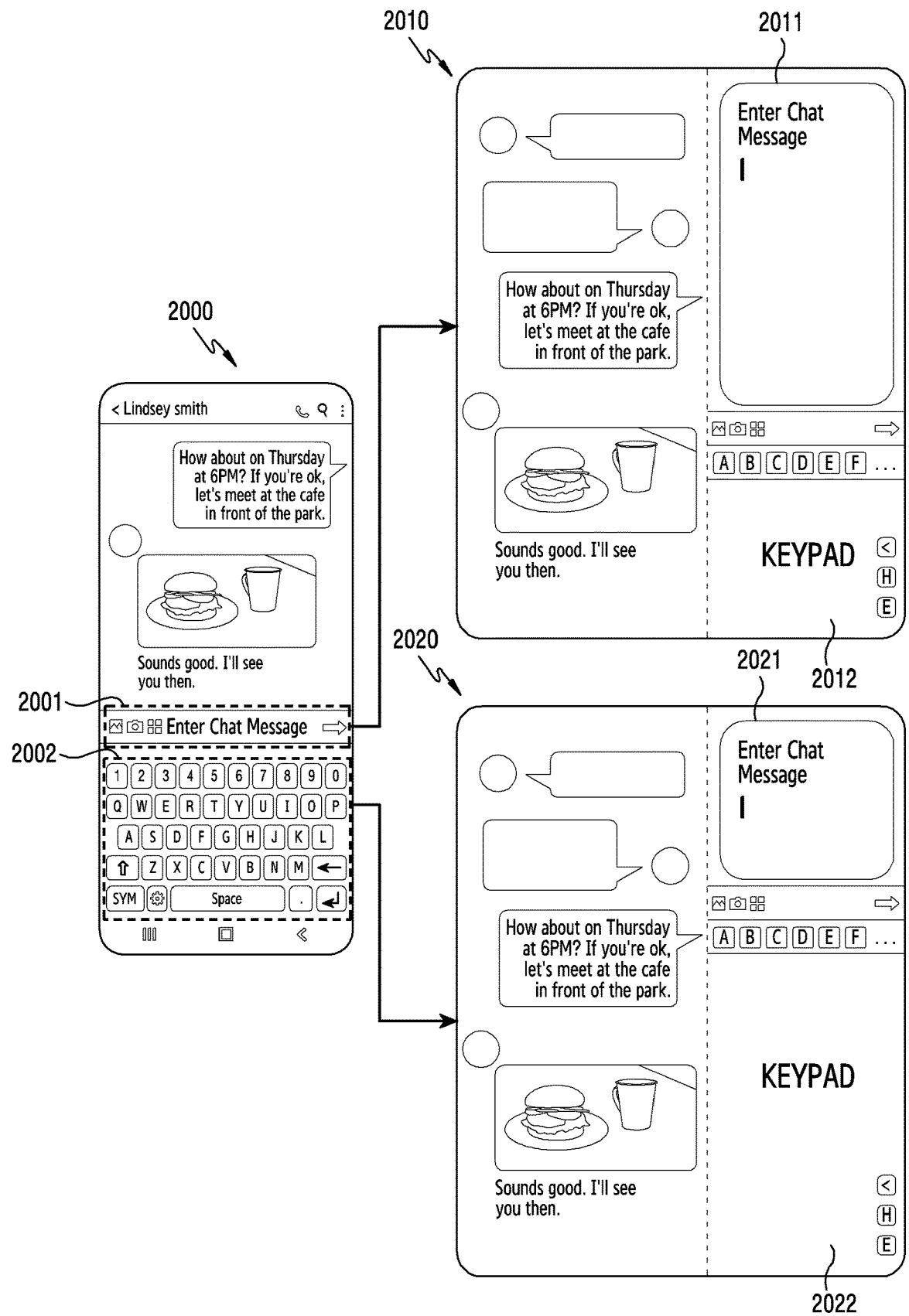
FIG. 20 is a diagram illustrating an example of a screen displayed by an electronic device to provide an input UI configured based on a user input according to an embodiment of the disclosure.

FIG. 20 is a diagram illustrating an example of a screen displayed by an electronic device (e.g., the electronic device 100 of FIGS. 1 and 2, the electronic device 30 of FIGS. 3 and 4, the electronic device 101 of FIG. 5, or the electronic device 101 of FIG. 6) to provide an input UI configured based on a user input according to an embodiment of the disclosure.

Referring to FIG. 5, the electronic device may display a screen 2000 including an input field 2001 and a keypad 2002. When the display region is expanded while the input field 2001 is selected, the electronic device may display a screen 2010 including an input UI displayed on an area where the input field 2011 is wider than the keypad area 2012. Conversely, when the display region is expanded while the keypad 2002 is selected, the electronic device may display a screen 2020 where the keypad 2022 is wider than the input field 2021.

Figure 21:
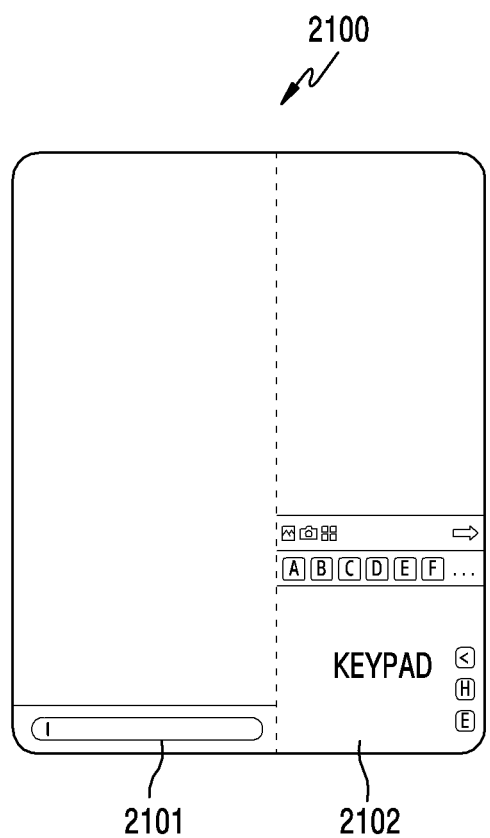
FIG. 21 is a diagram illustrating an example of a screen displayed by an electronic device to provide an input UI when a display region is expanded according to an embodiment of the disclosure.

FIG. 21 is a diagram illustrating an example of a screen displayed by an electronic device (e.g., the electronic device 100 of FIGS. 1 and 2, the electronic device 30 of FIGS. 3 and 4, the electronic device 101 of FIG. 5, or the electronic device 101 of FIG. 6) to provide an input UI when the display region is expanded according to an embodiment of the disclosure.

When the display region is expanded while a screen (e.g., the screen 810 of FIG. 8) displaying an input field (e.g., the text input field 811 of FIG. 8) is displayed, the electronic device according to various embodiments may display a screen 2100 for further displaying an additional UI component 2102 while the display of the input field 2101 is maintained.

Figure 22:
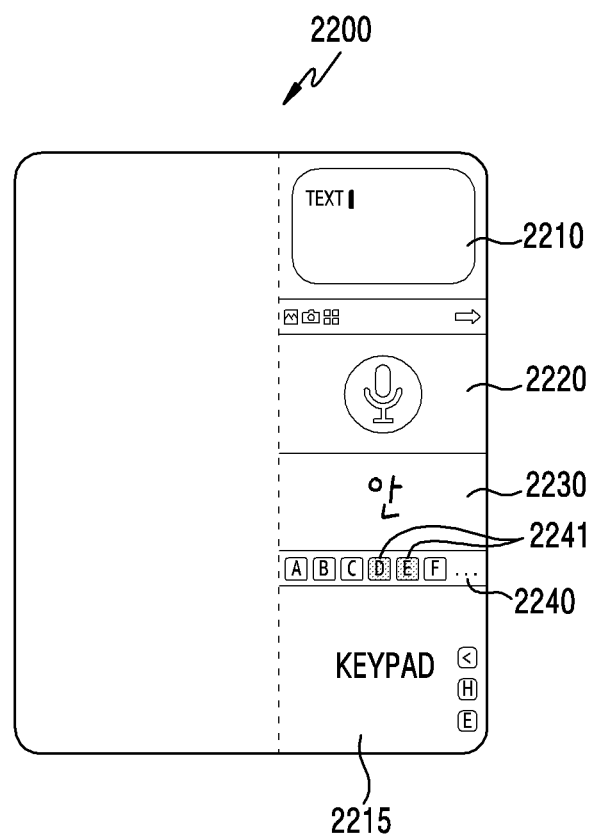
FIG. 22 is a diagram illustrating an example of a screen displayed by an electronic device to provide an input UI including a voice input UI component and a handwriting input UI component according to an embodiment of the disclosure.

FIG. 22 is a diagram illustrating an example of a screen displayed by an electronic device (e.g., the electronic device 100 of FIGS. 1 and 2, the electronic device 30 of FIGS. 3 and 4, the electronic device 101 of FIG. 5, or the electronic device 101 of FIG. 6) to provide an input UI including a voice input UI component and a handwriting input UI component according to an embodiment of the disclosure.

The electronic device may display an input UI including UI components for receiving a user input using a plurality of input methods. For example, in a state in which a screen (e.g., the screen 820 of FIG. 8) including an input UI including an input area (e.g., the text input field 821 of FIG. 8), a toolbar (e.g., the toolbar 823 of FIG. 8), and a keypad (e.g., the keypad 822 of FIG. 8) is displayed, the electronic device may receive a user input for selecting a voice input button and a handwriting input button 2241 among function buttons included in the toolbar. The electronic device may add a voice input UI area 2220 and a handwriting input area 2230 to the input UI in response to the selection of the voice input button and the handwriting input button among the buttons 2241 in the toolbar 2240. Accordingly, the electronic device may display a screen 2200 including an input UI including an input field 2210, a voice input UI area 2220, a handwriting input area 2230, and a keypad 2215.

Figure 23:
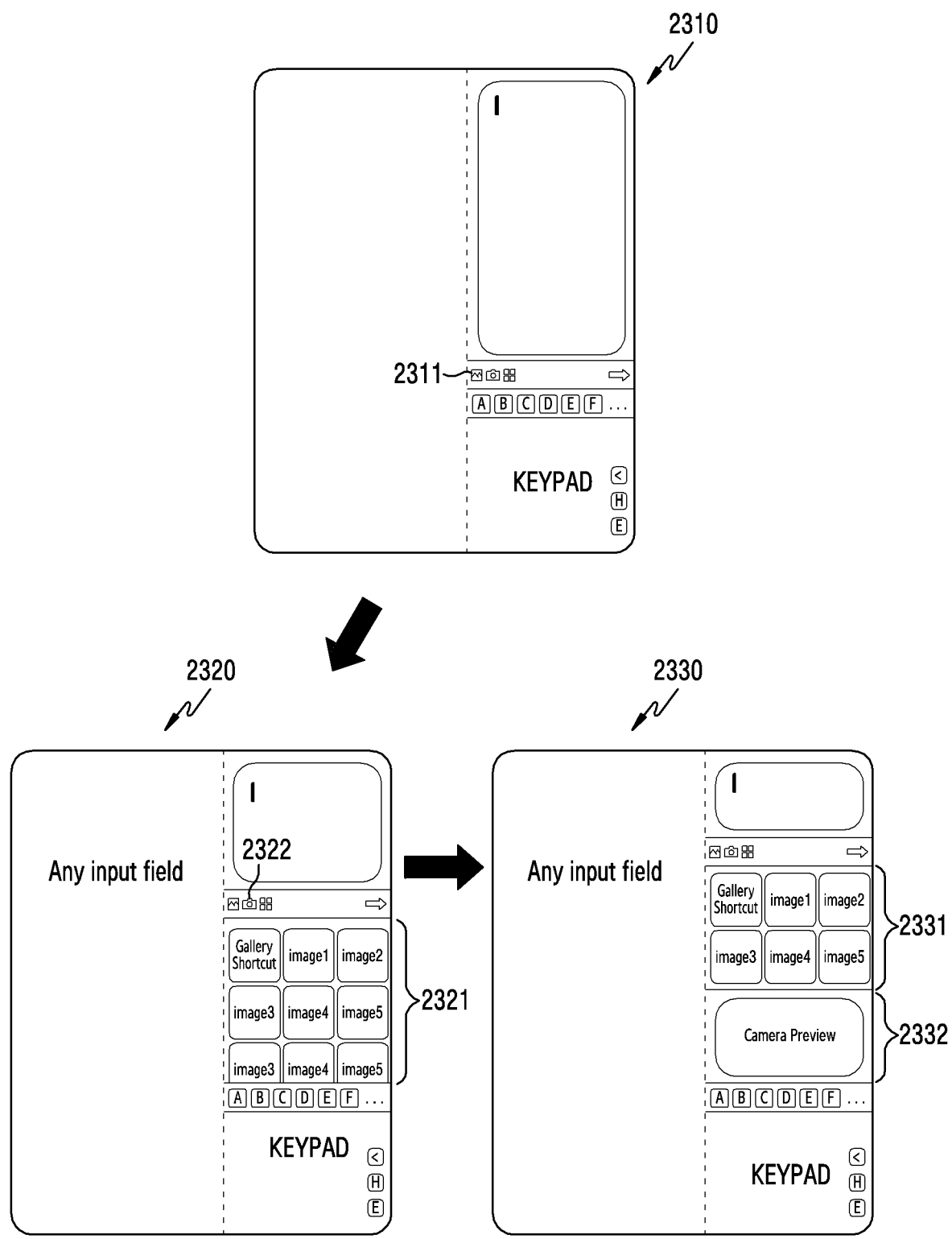
FIG. 23 is a diagram illustrating an example of a screen displayed by an electronic device to provide an input UI capable of inputting an image according to an embodiment of the disclosure.

FIG. 23 is a diagram illustrating an example of a screen displayed by an electronic device (e.g., the electronic device 100 of FIGS. 1 and 2, the electronic device 30 of FIGS. 3 and 4, the electronic device 101 of FIG. 5, or the electronic device 101 of FIG. 6) to provide an input UI capable of inputting an image according to an embodiment of the disclosure.

The electronic device may display a screen 2310 including an input UI in a state where the display region is expanded. According to an embodiment, the input UI may include an image input function button 2311 for providing an image insertion function. The electronic device may receive a user input for selecting the image input function button 2311.

In response to the selection of the image input function button 2311, the electronic device may configure an input UI including an image list area 2321 displaying a thumbnail list of images stored in the electronic device in order to select an image to be input. The electronic device may display a screen 2320 including the configured input UI. While the screen 2320 is displayed, the electronic device may receive a user input for selecting a camera input button 2322 for inserting an image captured through a camera.

In response to the selection of the camera input button 2322, the electronic device may add a preview area 2332 for displaying a preview image captured using the camera to the input UI. The preview area 2332 may be added so that a screen 2330 including the input UI including the image list area 2331 and the preview area 2332 may be displayed.

Figure 24:
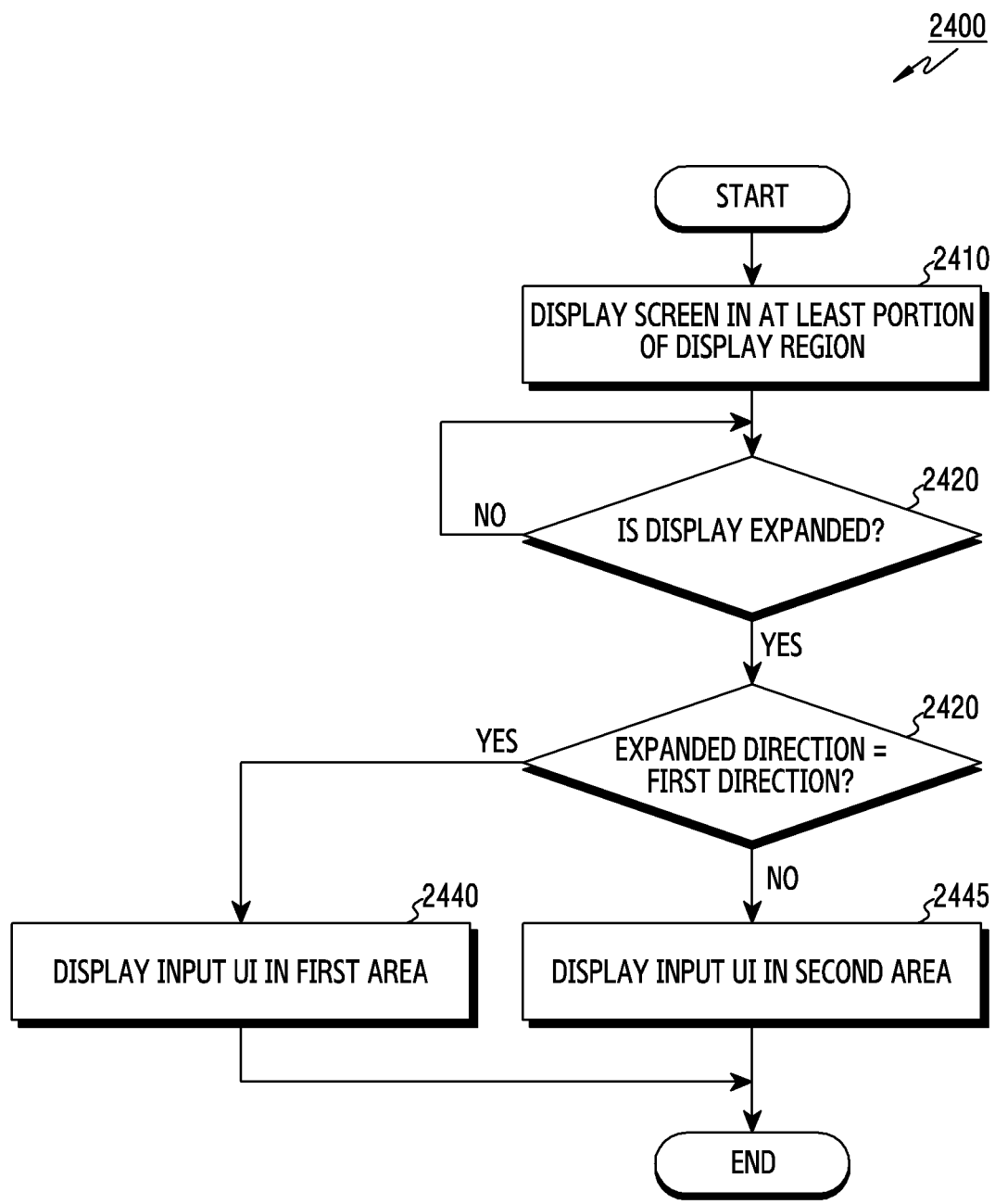
FIG. 24 is a flowchart illustrating a process of outputting an input UI based on an expansion direction of a display region by an electronic device according to an embodiment of the disclosure.

FIG. 24 is a flowchart 2400 illustrating a process in which an electronic device (e.g., the electronic device 100 of FIGS. 1 and 2, the electronic device 30 of FIGS. 3 and 4, the electronic device 101 of FIG. 5, or the electronic device 101 of FIG. 6) outputs an input UI based on an expansion direction of the display region according to an embodiment of the disclosure.

The electronic device according to various embodiments may be configured to expand the display region in a plurality of directions (e.g., +x direction and −x direction in FIG. 1). The electronic device capable of expanding the display region in at least one of the plurality of directions may perform operation 2410 of displaying a screen on at least a portion of the display region. The electronic device may perform operation 2420 of identifying an expansion of the display region while the screen is being displayed.

When the expansion of the display region is identified, the electronic device may perform operation 2430 of determining whether the expansion direction is a first direction (e.g., the +x direction in FIG. 1). When the expansion direction is the first direction, the electronic device may perform operation 2440 of displaying an input UI in a first area. For example, the first area may be an area disposed in a direction in which the display region is expanded within the screen (e.g., the +x direction in FIG. 1). For another example, the first area may be an area where the display region inserted into the housing is retreated to the outside as the display region is expanded in the first direction (e.g., the +x direction in FIG. 1). When the expansion direction is a second direction, the electronic device may perform operation 2445 of displaying the input UI in the second area. For example, the second area may be an area disposed in a direction in which the display region is expanded within the screen (e.g., the −x direction in FIG. 1). For another example, the second area may be an area in which the display region inserted into the housing is retreated to the outside as the display region is expanded in the second direction (e.g., the −x direction in FIG. 1).

Figure 25:
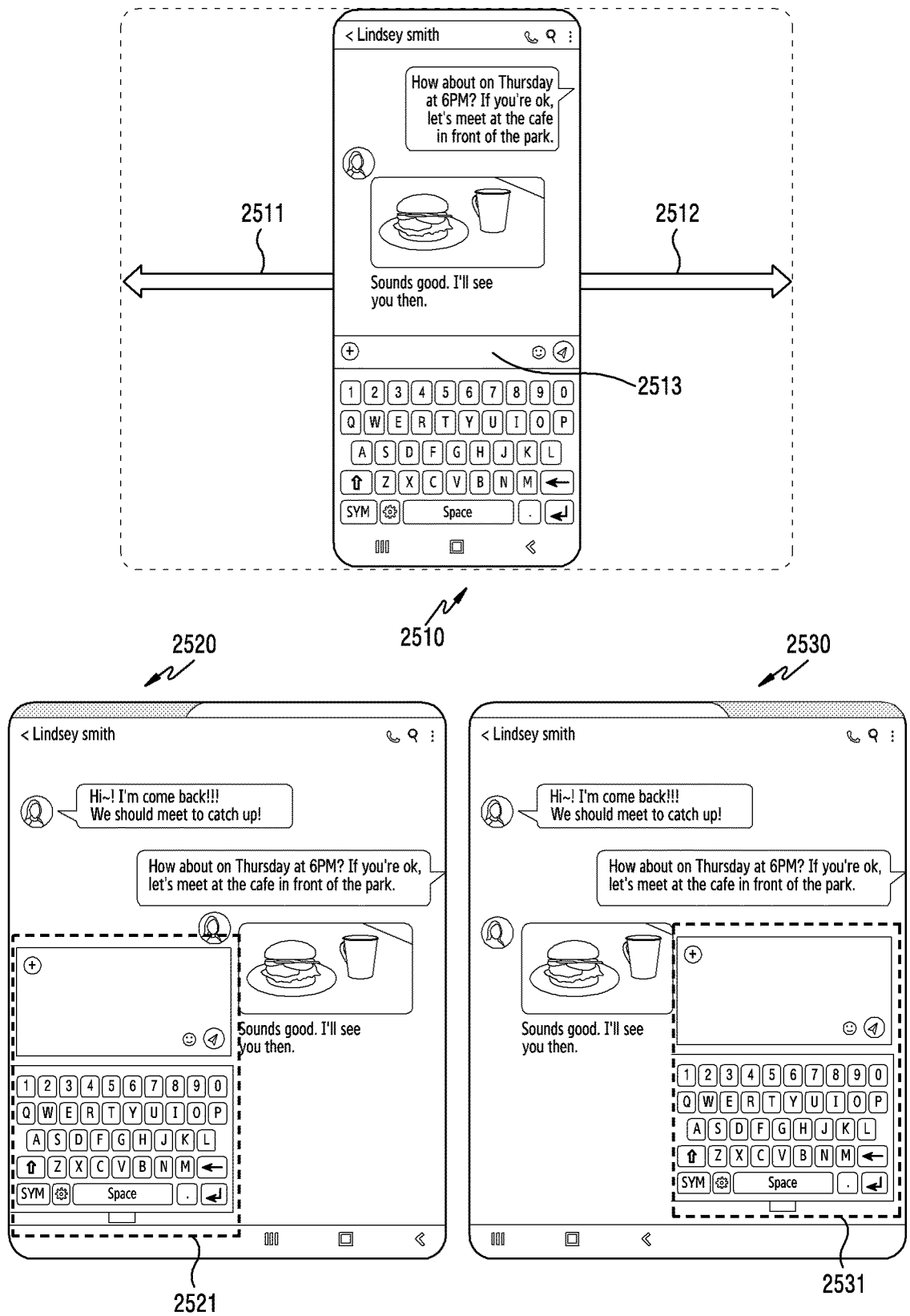
FIG. 25 is a diagram illustrating an example of a screen displayed by an electronic device to provide an input UI based on an expansion direction of a display region according to an embodiment of the disclosure.

FIG. 25 is a diagram illustrating an example of a screen displayed by an electronic device (e.g., the electronic device 100 of FIGS. 1 and 2, the electronic device 30 of FIGS. 3 and 4, the electronic device 101 of FIG. 5, or the electronic device 101 of FIG. 6) to provide an input UI based on an expansion direction of the display region according to an embodiment of the disclosure.

According to an embodiment, the electronic device displaying a screen 2510 including an input field 2513 may expand the display region in a first direction 2511 or a second direction 2512. When the display region is expanded in the first direction 2511, the electronic device may display a screen 2520 on which the input UI is displayed on a first area 2521. Conversely, when the display region is expanded in the second direction 2512, the electronic device may display a screen 2530 on which the input UI is displayed on a second area 2531.

An electronic device according to various embodiments may include a display configured to display a screen on at least a portion of a display region, a sensor configured to detect an expansion or reduction of the display region, and a processor configured to be operatively connected to the display. The processor may be configured to receive a user input related to the screen displayed on the at least the portion of the display region, identify the expansion of the display region through the sensor, and display an input UI including a UI component determined based on the user input, on at least a portion of the expanded display region in response to the reception of the user input and the identification of the expansion of the display region.

According to various embodiments, the screen displayed on the at least the portion of the display region may include a UI object related to a function provided by the electronic device. The processor may be further configured to select the UI object based on the user input, determine a function related to the UI object, and determine the UI component included in the input UI based on the determined function, and the UI component may be configured to control the display so that UI component may be displayed on a region having a larger area than an area of a region in which the UI object is displayed.

According to various embodiments, the user input may include a touch input. The processor may be further configured to configure the input UI based on the UI object based on the identification of the expansion of the display region while the UI object within the screen is selected by the touch input, control the display to display the input UI on a portion of the display region, and control the display to expand and display the screen in a direction in which the display region is expanded based on the identification of the expansion of the display region while the UI object is not selected.

According to various embodiments, the screen may include at least one of an input field for displaying input content or a function item for executing a function provided by the electronic device. The user input may be for at least one of the input field or the function item.

According to various embodiments, the screen displayed on the at least the portion of the display region may include an execution screen of at least one application. The processor may be further configured to control the display to display the input UI based on information about the at least one application.

According to various embodiments, the information about the at least one application may include at least one of information about a type of the at least one application or information about whether the execution screen of the at least one application corresponds to a plurality of applications. The processor may be further configured to determine an area where the input UI is to be displayed based on the information about the at least one application.

The processor of the electronic device according to various embodiments may be configured to determine a size of the region where the UI component is displayed within the input UI based on the user input.

According to various embodiments, the user input may include a touch input for selecting an object related to the UI component. The processor may be further configured to determine the size of the region where the UI component is displayed based on a length of a time period during which the touch input is maintained.

According to various embodiments, the input UI may include a plurality of UI components for receiving a user input through different input methods. The plurality of UI components may include at least one of a keypad component for receiving a text input, a voice input component for receiving a voice input, or a handwriting input area component for receiving a handwriting input.

According to various embodiments, the UI component included in the input UI may include an image list for selecting an image stored in the electronic device.

The electronic device according to various embodiments may further include a camera. The UI component included in the input UI may include a preview image obtained through the camera.

The electronic device according to various embodiments may be configured to expand or reduce the display region in a first direction or a second direction. The processor may be further configured to determine a direction of expansion of the display through the sensor, and determine a region where the input UI is displayed based on the determined direction.

A method performed by an electronic device including a display according to various embodiments may include displaying a screen on at least a portion of a display region of the display, receiving a user input related to a screen displayed on the at least the portion of the display region, identifying an expansion of the display region through a sensor of the electronic device, and displaying an input UI including a UI component determined based on the user input, on at least a portion of the expanded display region in response to the receiving of the user input and the identifying of the expansion of the display region.

According to various embodiments, the screen displayed in the at least the portion of the display region may include a UI object related to a function provided by the electronic device. The method of operating the electronic device according to various embodiments may further include selecting the UI object based on the user input, determining a function related to the UI object, and determining the UI component included in the input UI based on the determined function. The displaying of the input UI may include displaying the UI component on a region having a larger area than an area of a region in which the UI object is displayed.

According to various embodiments, the user input may include a touch input. The displaying of the input UI may include configuring the input UI based on the UI object based on the identification of the expansion of the display region while the UI object within the screen is selected by the touch input, displaying the input UI on a portion of the display region, and expanding and displaying the screen in a direction in which the display region is expanded based on the identification of the expansion of the display region while the UI object is not selected.

According to various embodiments, the screen displayed on the at least the portion of the display region may include an execution screen of at least one application. The method of operating the electronic device according to various embodiments may further include determining a type of the at least one application or whether the execution screen of the at least one application corresponds to a plurality of applications, and determining the region where the input UI is to be displayed based on the determination result.

According to various embodiments, the user input may include a touch input for selecting the object related to the UI component included in the input UI, and the displaying of the input UI may include determining a size of a region where the UI component is displayed based on a length of a time period during which the touch input is maintained.

According to various embodiments, the input UI may include a plurality of UI components for receiving a user input through different input methods.

The method of operating the electronic device according to various embodiments may further include determining a direction in which the display is expanded and determining the region where the input UI is displayed based on the determined direction.

The methods according to various embodiments described in the claims or the specification of the disclosure may be implemented by hardware, software, or a combination of hardware and software.

When the methods are implemented by software, a non-transitory computer-readable storage medium for storing one or more programs (software modules) may be provided. The one or more programs stored in the non-transitory computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including a first housing part and a second housing part configured to movably engage with the first housing part between a retracted position and an extended position;
   a flexible display coupled to the first housing part and the second housing part such that a size of an area of the flexible display that is visible from a front side of the housing changes as the housing is moved between the retracted position and the extended position;
   a mechanical structure in which a mechanical operation occurs to move the second housing part with respect to the first housing part;
   at least one processor; and
   memory storing instructions which, when executed by the at least one processor, cause the electronic device to:
   display a screen comprising a first input user interface (UI) including a UI object displayed on at least a portion of the area of the flexible display that is visible from the front side based on a first layout, the UI object being associated with an input function of the electronic device,
   receive a first user input selecting the UI object displayed on the at least the portion of the area of the flexible display,
   change the area of the flexible display that is visible from the front side by the mechanical structure, and
   display a second input UI comprising a UI component for receiving a second user input through an input method corresponding to the input function associated with the selected UI object, on at least a portion of the changed area, in response to the receiving of the first user input and the changed area.

2. The electronic device of claim 1,
   wherein the screen displayed on the at least the portion of the area of the flexible display that is visible from the front side comprises a UI object related to a function provided by the electronic device,
   wherein the instructions, when executed by the at least one processor, further cause the electronic device to:
   select the UI object based on the first user input,
   determine the function related to the UI object, and
   determine the UI component to be included in the second input UI based on the determined function, and
   wherein the UI component controls the flexible display so that the UI component is displayed on a region having a larger area than an area of a region in which the UI object is displayed.

3. The electronic device of claim 1,
   wherein the first user input comprises a touch input, and
   wherein the instructions, when executed by the at least one processor, further cause the electronic device to:
   configure the second input UI based on the UI object when the area of the flexible display that is visible from the front side is changed while the UI object within the screen is selected by the touch input,
   control the flexible display to display the second input UI on a portion of the area of the flexible display that is visible from the front side, and
   control the flexible display to expand and display the screen in a direction in which the area of the flexible display that is visible from the front side is expanded while the UI object is not selected.

4. The electronic device of claim 1,
   wherein the screen comprises at least one of an input field for displaying input content or a function item for executing a function provided by the electronic device, and
   wherein the first user input relates to at least one of the input field or the function item.

5. The electronic device of claim 1,
   wherein the screen displayed on the at least the portion of the area of the flexible display that is visible from the front side comprises an execution screen of at least one application, and
   wherein the instructions, when executed by the at least one processor, further cause the electronic device to:
   control the flexible display to display the second input UI based on information about the at least one application.

6. The electronic device of claim 5,
   wherein the information about the at least one application comprises at least one of information about a type of the at least one application or information about whether the execution screen of the at least one application corresponds to a plurality of applications, and
wherein the instructions, when executed by the at least one processor, further cause the electronic device to:
determine an area where the second input UI is to be displayed based on the information about the at least one application.

7. The electronic device of claim 1, wherein the instructions, when executed by the at least one processor, further cause the electronic device to:
determine a size of the area of the flexible display that is visible from the front side where a UI component is displayed within the second input UI based on the first user input.

8. The electronic device of claim 7,
wherein the first user input comprises a touch input for selecting the UI object related to a UI component, and
wherein the instructions, when executed by the at least one processor, further cause the electronic device to:
determine the size of the area of the flexible display that is visible from the front side where the UI component is displayed based on a length of a time period during which the touch input is maintained.

9. The electronic device of claim 1, wherein the second input UI comprises the UI component added to the first input UI or expanded from a portion of the first input UI.

10. The electronic device of claim 1, wherein the second input UI comprises at least one of a keypad component for receiving a text input, a voice input component for receiving a voice input, or a handwriting input area component for receiving a handwriting input, corresponding to the input method.

11. The electronic device of claim 1,
wherein the instructions, when executed by the at least one processor, further cause the electronic device to:
determine a second layout based on the UI object which is relating the first user input, and
wherein the second layout comprises a UI component comprising an image list for selecting an image stored in the electronic device.

12. The electronic device of claim 1, further comprising:
a camera,
wherein the instructions, when executed by the at least one processor, further cause the electronic device to:
determine a second layout based on the UI object which is relating the first user input, and
wherein the second layout comprises a UI component comprising a preview image obtained through the camera.

13. The electronic device of claim 1,
wherein the area of the flexible display that is visible from the front side is configured to be expanded or reduced in a first direction or a second direction, and
wherein the instructions, when executed by the at least one processor, further cause the electronic device to:
determine a direction of expansion of the area of the flexible display that is visible from the front side, and
determine the area of the flexible display that is visible from the front side where the second input UI is displayed based on the determined direction.

14. A method performed by an electronic device comprising a housing including a first housing part and a second housing part configured to movably engage with the first housing part between a retracted position and an extended position, a flexible display coupled to the first housing part and the second housing part such that a size of an area of the flexible display that is visible from a front side of the housing changes as the housing is moved between the retracted position and the extended position, and a mechanical structure in which a mechanical operation occurs to move the second housing part with respect to the first housing part, the method comprising:
displaying a screen comprising a first input user interface (UI) including a UI object displayed on at least a portion of the area of the flexible display that is visible from the front side based on a layout, the UI object being associated with an input function of the electronic device;
receiving a first user input selecting the UI object displayed on the at least the portion of the area of the flexible display;
changing the area of the flexible display that is visible from the front side by the mechanical structure; and
displaying a second input UI comprising a UI component for receiving a second user input through an input method corresponding to the input function associated with the selected UI object, on at least a portion of the changed area, in response to the receiving of the first user input and the changed area.

15. The method of claim 14,
wherein the screen displayed on the at least the portion of the area of the flexible display that is visible from the front side comprises a UI object related to a function provided by the electronic device,
wherein the method further comprises:
selecting the UI object based on the first user input;
determining the function related to the UI object; and
determining the UI component to be included in the second input UI based on the determined function, and
wherein the UI component controls the flexible display so that the UI component is displayed on a region having a larger area than an area of a region in which the UI object is displayed.

16. The method of claim 14,
wherein the first user input comprises a touch input, and
wherein the displaying of the second UI comprises:
configuring the second input UI based on the UI object when the area of the flexible display that is visible from the front side is changed while the UI object within the screen is selected by the touch input;
controlling the flexible display to display the second input UI on a portion of the area of the flexible display that is visible from the front side; and
controlling the flexible display to expand and display the screen in a direction in which the area of the flexible display that is visible from the front side is expanded while the UI object is not selected.

17. The method of claim 14,
wherein the screen comprises at least one of an input field for displaying input content or a function item for executing a function provided by the electronic device, and
wherein the first user input relates to at least one of the input field or the function item.

18. The method of claim 14,
wherein the screen displayed on the at least the portion of the area of the flexible display that is visible from the front side comprises an execution screen of at least one application, and wherein the method further comprises:
    controlling the flexible display to display the second input UI based on information about the at least one application.

* * * * *